United States Patent
Arai et al.

(10) Patent No.: US 8,497,894 B2
(45) Date of Patent: Jul. 30, 2013

(54) OPTICAL SCANNER AND IMAGE FORMING APPARATUS

(75) Inventors: Nobuyuki Arai, Kanagawa (JP); Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 259 days.

(21) Appl. No.: 12/950,263

(22) Filed: Nov. 19, 2010

(65) Prior Publication Data

US 2011/0122217 A1    May 26, 2011

(30) Foreign Application Priority Data

Nov. 25, 2009   (JP) ................................. 2009-266972

(51) Int. Cl.
*B41J 27/00*   (2006.01)
*B41J 2/435*   (2006.01)

(52) U.S. Cl.
USPC ............ 347/256; 347/260; 347/241; 347/224

(58) Field of Classification Search
USPC .......................... 347/241, 256, 260, 261, 224
See application file for complete search history.

(56) References Cited

U.S. PATENT DOCUMENTS

| | | | |
|---|---|---|---|
| 6,222,661 B1 * | 4/2001 | Takeuchi et al. | ............ 359/205.1 |
| 6,853,397 B2 * | 2/2005 | Onishi | ............ 347/241 |
| 6,924,938 B2 | 8/2005 | Nishina et al. | |
| 6,930,812 B2 * | 8/2005 | Yamawaki | ................ 359/204.1 |
| 7,626,744 B2 | 12/2009 | Arai et al. | |
| 2002/0060829 A1 * | 5/2002 | Ueda | ............ 359/205 |
| 2005/0185236 A1 * | 8/2005 | Kudo | ............ 359/205 |
| 2008/0219601 A1 | 9/2008 | Arai et al. | |
| 2008/0267662 A1 | 10/2008 | Arai et al. | |
| 2008/0285104 A1 | 11/2008 | Arai et al. | |
| 2009/0141316 A1 | 6/2009 | Arai et al. | |
| 2009/0195636 A1 | 8/2009 | Arai et al. | |
| 2009/0314927 A1 | 12/2009 | Tatsuno et al. | |
| 2010/0124434 A1 | 5/2010 | Tatsuno | |

FOREIGN PATENT DOCUMENTS

| JP | 3243013 | 10/2001 |
|---|---|---|
| JP | 2007-156248 | 6/2007 |

\* cited by examiner

*Primary Examiner* — Stephen Meier
*Assistant Examiner* — Sarah Al Hashimi
(74) *Attorney, Agent, or Firm* — Cooper & Dunham LLP

(57) ABSTRACT

An optical scanning system for a K station includes a resin scanning lens and three reflecting mirrors. Two reflectance ratios are calculated: one being the reflectance ratio of a luminous flux traveling toward the scanning start position of a drum-shaped photosensitive drum and the other being the reflectance ratio of a luminous flux traveling toward the scanning end position of the photosensitive drum. The magnitude relation between the two reflectance ratios is such that the reflecting mirror has an inverse magnitude relation to that of the other reflecting mirrors. Moreover, the difference is calculated between the largest value and the smallest value of the reflectance ratio, where the reflectance ratio depends on the angle of deviation of the polygon mirror. The reflecting mirror has the largest difference among the three reflecting mirrors.

19 Claims, 41 Drawing Sheets

FIG. 5

|  | SCANNING LENS ||
|  | INPUT SURFACE (FIRST SURFACE) | OUTPUT SURFACE (SECOND SURFACE) |
| --- | --- | --- |
| $R_m$ | 220 | −171.7072 |
| $R_{s0}$ | −40 | −17.4663 |
| $a_{00}$ | −4.77 | 6.32 |
| $a_{04}$ | $-4.91 \times 10^{-7}$ | $-3.93 \times 10^{-7}$ |
| $a_{06}$ | $3.33 \times 10^{-10}$ | $1.59 \times 10^{-10}$ |
| $a_{08}$ | $2.41 \times 10^{-13}$ | $-5.40 \times 10^{-14}$ |
| $a_{10}$ | $1.33 \times 10^{-16}$ | $1.11 \times 10^{-17}$ |
| $a_{12}$ | $-3.57 \times 10^{-20}$ | $3.63 \times 10^{-21}$ |
| $a_{14}$ | $-3.75 \times 10^{-24}$ | $-6.29 \times 10^{-25}$ |
| $b_{01}$ | − | $-6.80 \times 10^{-7}$ |
| $b_{02}$ | − | $-4.14 \times 10^{-7}$ |
| $b_{03}$ | − | $-3.24 \times 10^{-9}$ |
| $b_{04}$ | − | $-1.73 \times 10^{-9}$ |
| $b_{05}$ | − | $1.65 \times 10^{-12}$ |
| $b_{06}$ | − | $-8.18 \times 10^{-14}$ |
| $b_{07}$ | − | $-2.17 \times 10^{-16}$ |
| $b_{08}$ | − | $1.11 \times 10^{-16}$ |

| d1 | d2 | d3 | d4 | d5 | d6 | d7 | d8 | d9 |
|---|---|---|---|---|---|---|---|---|
| 25.19 | 4.50 | 14.60 | 8.16 | 3.00 | 95.00 | 48.09 | 21.05 | 140.56 |

(UNIT: mm)

| | REFLECTING MIRROR | θm [°] |
|---|---|---|
| K STATION | 2106a | +50 |
| | 2107a | −40 |
| | 2108a | −55 |
| C STATION | 2106b | +40 |
| | 2107b | −50 |
| | 2108b | −35 |

|  | REFLECTING MIRROR | θm [°] |
|---|---|---|
| K STATION | 2106a | +45 |
|  | 2107a | -41 |
|  | 2108a | -51 |
| C STATION | 2106b | +50 |
|  | 2107b | -40 |
|  | 2108b | -35 |

|  | OPTICAL ELEMENT | θm [°] |
|---|---|---|
| K STATION | 2106a | +14 |
|  | 2107a | +69 |
|  | 2109a | +20 |
| C STATION | 2106b | +50 |
|  | 2107b | −40 |
|  | 2108b | −55 |
|  | 2109b | −20 |
| M STATION | 2106c | +40 |
|  | 2107c | −50 |
|  | 2108c | −35 |
|  | 2109c | +20 |
| Y STATION | 2106d | +17 |
|  | 2107d | +56 |
|  | 2109d | −20 |

| | OPTICAL ELEMENT | $\theta m [°]$ |
|---|---|---|
| C STATION | 2106b | +45 |
| | 2107b | -41 |
| | 2108b | -51 |
| | 2109b | -21 |
| M STATION | 2106c | +50 |
| | 2107c | -40 |
| | 2108c | -35 |
| | 2109c | +21 |

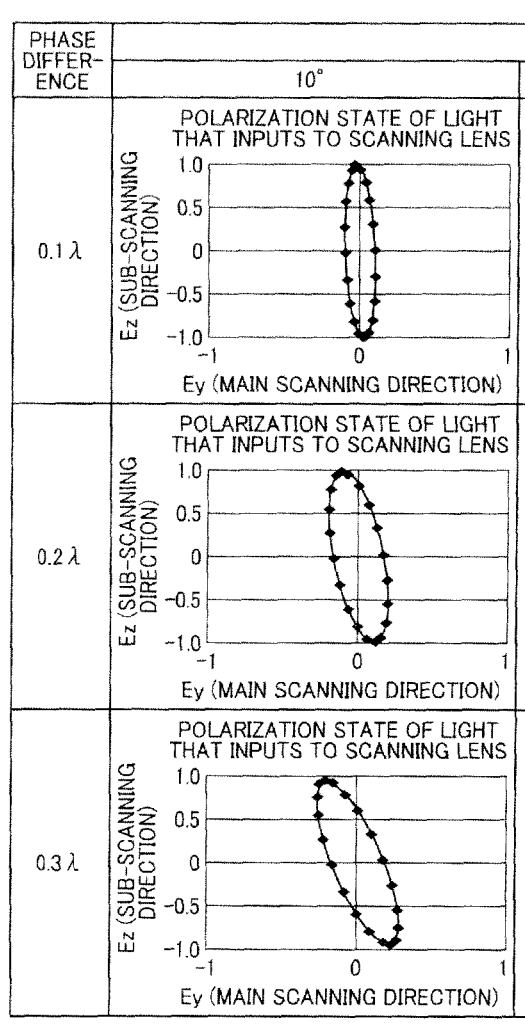

OPTICAL SCANNER AND IMAGE FORMING APPARATUS

CROSS-REFERENCE TO RELATED APPLICATIONS

The present application claims priority to and incorporates by reference the entire contents of Japanese Patent Application No. 2009-266972 filed in Japan on Nov. 25, 2009.

BACKGROUND OF THE INVENTION

1. Field of the Invention

The present invention relates to an optical scanner and an image forming apparatus and, more particularly, to an optical scanner that scans a subject to be scanned with a luminous flux and an image forming apparatus that includes the optical scanner.

2. Description of the Related Art

Optical scanners are used in image forming apparatuses, such as laser printers, optical plotters, digital copying machines, and facsimile machines. An optical scanner deflects a luminous flux emitted from a light source using an optical deflector and collects the deflected luminous flux on the subject to be scanned of an optical scanning system, thereby forming a spot of light on the subject to be scanned, and scans the subject to be scanned with the spot of light.

The subject to be scanned of the image forming apparatus is, for example, a photoconductive and photosensitive image carrier.

For example, a tandem-type color printer includes four image carriers arranged in parallel each other in the conveying direction of a recording sheet. Each image carrier has a cylindrical photosensitive element. An optical scanner used in the tandem-type color printer includes a plurality of light sources each of which corresponding to one of four colors (yellow, magenta, cyan, and black, in general). Luminous fluxes emitted from the light sources are deflected by one optical deflector. The deflected luminous fluxes pass through respective optical scanning systems and then scan respective image carriers, thereby forming latent images on the respective image carriers. Each latent image is then developed into a visible image with a developer of the corresponding color. Subsequently, the visible images are sequentially transferred onto a recording sheet in a superimposed manner and then fixed on the recording sheet. A color image is thus formed.

In recent years, the image forming apparatuses have been required to increase the speed of image forming and improve the quality of the images. One approach that achieves an increase in the speed of optical scanning is to increase the deflecting speed of optical deflectors, for example, to increase the rotating speed of polygon mirrors. This approach, however, brings problems of noise, heat, etc., due to high-speed rotation and any increase in the rotating speed has its limitations. As an alternative approach, to illuminate one image carrier with a plurality of luminous fluxes, thereby scanning a plurality of lines at the same time was devised.

This approach is realized using something known as a multi-beam light source, which includes a plurality of light-emitting elements.

In terms of improving the image quality, stabilizing the image density is especially required. For stabilizing the image density, it is necessary to evenly maintain the intensity of light that illuminates the photosensitive element. In order to maintain the intensity of light on the photosensitive drum at a constant level, in general, the intensities of the luminous fluxes emitted from light-emitting elements are set to be equal using an auto power control (APC); however, with an APC, it is difficult to correct variation in the intensity of light that occurs due to an optical scanning system.

As one of the causes of the variation in the intensity of light that occurs due to the optical scanning system, variation in the direction of polarization among the light-emitting elements is conceivable. If the direction of polarization varies, variation in the reflectance of the polygon mirror and the reflecting mirrors occurs, and variation in the transmittance of the scanning lenses and dustproof glasses also occurs, which results in an output image with uneven density.

Optical scanners that aim to suppress unevenness in the image density have been devised.

Japanese Patent Application Laid-open No. 2007-156248, for example, discloses an optical scanner that includes a plurality of light sources, an optical system, a deflector element, and a correcting optical element. The optical system includes a plurality of optical elements that cause light beams emitted from the light sources to form images on a surface of the object that is scanned. The deflector element deflects the light beams in the main-scanning direction, thereby scanning the surface of the object that is scanned. The correcting optical element is disposed on the output side of the deflector element and allows the deflected light beam to pass therethrough. In the above described optical scanner, correcting optical element is arranged so that the composite transmittance of the deflector element and the correcting optical elements are substantially equal at an arbitrary angle of deviation of the deflector element.

Japanese Patent Application Laid-open No. H6-148547 discloses an optical scanner that can perform shading correction. This optical scanner includes a plano-convex cylinder lens that causes a parallel luminous flux to form a linear image running in the main-scanning direction. The light-source-side surface of the cylinder lens has a plane surface. The input surface, i.e., the plane surface of the cylinder lens is coated with a birefringent oxide so that the cylinder lens can convert linearly polarized light into substantially circularly polarized light.

Widely used scanning lenses include a molded resin lens. The molded resin scanning lens makes the incident light to cause different birefringence depending on the position of incidence. This is because unequal temperature distribution or unequal stress distribution that occurs during the cool down of the high-temperature resin in a metal mold. When a luminous flux passes through the scanning lens, the direction of polarization of the luminous flux is changed in a different manner depending on the position from which the luminous flux is output, which causes variation in the reflectance of a reflecting mirror that is arranged downstream of the scanning lens.

When a light beam with the direction of polarization parallel to the sub-scanning direction (see FIG. 60) is input to the scanning lens and birefringence occurs, the polarized state of the light beam after passing through the scanning lens is changed as illustrated in FIG. 61. As is clear from FIG. 61, as the phase difference increases and the optical axis deviation increases, due to the birefringence, linearly polarized incident light has more polarization components parallel to the main-scanning direction and elliptically polarized light is output. The reflectance of p-polarized light reflected by the reflecting mirror is different from the reflectance of s-polarized light; therefore, if the polarization of the light beam varies depending on the image height, the deviation of the light use efficiency with respect to the image height increases.

The optical scanner disclosed in Japanese Patent Application Laid-open No. 2007-156248 only takes variation in the direction of polarization among the luminous fluxes emitted from the light sources into consideration, it does not take the birefringence of the scanning lens into consideration at all.

The optical scanner disclosed in Japanese Patent Application Laid-open No. H6-148547 does not take the effect of the birefringence of the scanning lens into consideration either.

With this configuration, even when a multi-beam light source and a molded plastic scanning lens are used, variation decreases in the intensity of light on the surface of the object to be scanned.

With this configuration, because an optical scanner according to the present invention is included, cost reduction is possible without decreasing the image quality.

SUMMARY OF THE INVENTION

It is an object of the present invention to at least partially solve the problems in the conventional technology.

According to an aspect of the present invention, an optical scanner that scans a subject to be scanned with a luminous flux in a main-scanning direction, the optical scanner comprises: a light source that includes a plurality of light-emitting elements; an optical deflector that deflects a luminous flux coming from the light source; a scanning lens that collects the luminous flux that has been deflected by the optical deflector, the scanning lens is made of resin; a plurality of reflecting lenses, and each reflecting lens bends a direction of an optical path of the luminous flux toward the subject to be scanned after the luminous flux passes through the scanning lens; and a dustproof glass that is disposed on the optical path of the luminous flux coming via the reflecting mirrors, and a reflectance ratio is calculated using each reflecting mirror as a characteristic value of the reflecting mirror, and the reflectance ratio is a ratio between a first reflectance of a first luminous flux that has a direction of polarization parallel to a sub-scanning direction and a second reflectance of a second luminous flux that has a direction of polarization parallel to the main-scanning direction, both the first luminous flux and the second luminous flux being emitted from the light source, a transmittance ratio is calculated using the dustproof glass as a characteristic value of the dustproof glass, and the transmittance ratio is a ratio between a first transmittance of the first luminous flux and a second transmittance of the second luminous flux, a magnitude relation between a first characteristic value and a second characteristic value is analyzed, and the first characteristic value is the characteristic value when the luminous flux travels toward a scanning start position of the subject to be scanned and the second characteristic value is the characteristic value when the luminous flux travels toward a scanning end position of the subject to be scanned, a difference is calculated between a maximum characteristic value and a minimum characteristic value, and one optical element selected from optical elements that include the reflecting mirrors and the dustproof glass has a magnitude relation inverse to that of the unselected optical elements and a difference larger than those of the unselected optical elements.

According to another aspect of the present invention, an optical scanner that scans a subject to be scanned with a luminous flux in a main-scanning direction, the optical scanner comprises: a light source that includes a plurality of light-emitting elements; an optical deflector that deflects a luminous flux coming from the light source; a scanning lens that collects the luminous flux that has been deflected by the optical deflector, and the scanning lens is made of resin; and a plurality of reflecting lenses, each reflecting lens bends a direction of an optical path of the luminous flux toward the surfaces to be canned after the luminous flux passes through the scanning lens, and a reflectance ratio is calculated using each reflecting mirror as a characteristic value of the reflecting mirror, and the reflectance ratio is a ratio between a first reflectance of a first luminous flux that has a direction of polarization parallel to a sub-scanning direction and a second reflectance of a second luminous flux that has a direction of polarization parallel to the main-scanning direction, both the first luminous flux and the second luminous flux being emitted from the light source, a magnitude relation between a first characteristic value and a second characteristic value is analyzed, and the first characteristic value is a characteristic value when the luminous flux travels toward a scanning start position of the subject to be scanned and the second characteristic value is a characteristic value when the luminous flux travels toward a scanning end position of the subject to be scanned, a difference is calculated between a largest characteristic value and a smallest characteristic value, and one optical element selected from optical elements that include the reflecting mirrors has a magnitude relation inverse to that of the unselected optical elements and a difference larger than those of the unselected optical elements.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table of properties that represent the shapes of the optical surfaces of a scanning lens;

DETAILED DESCRIPTION OF THE PREFERRED EMBODIMENTS

First Embodiment

Figure 1:
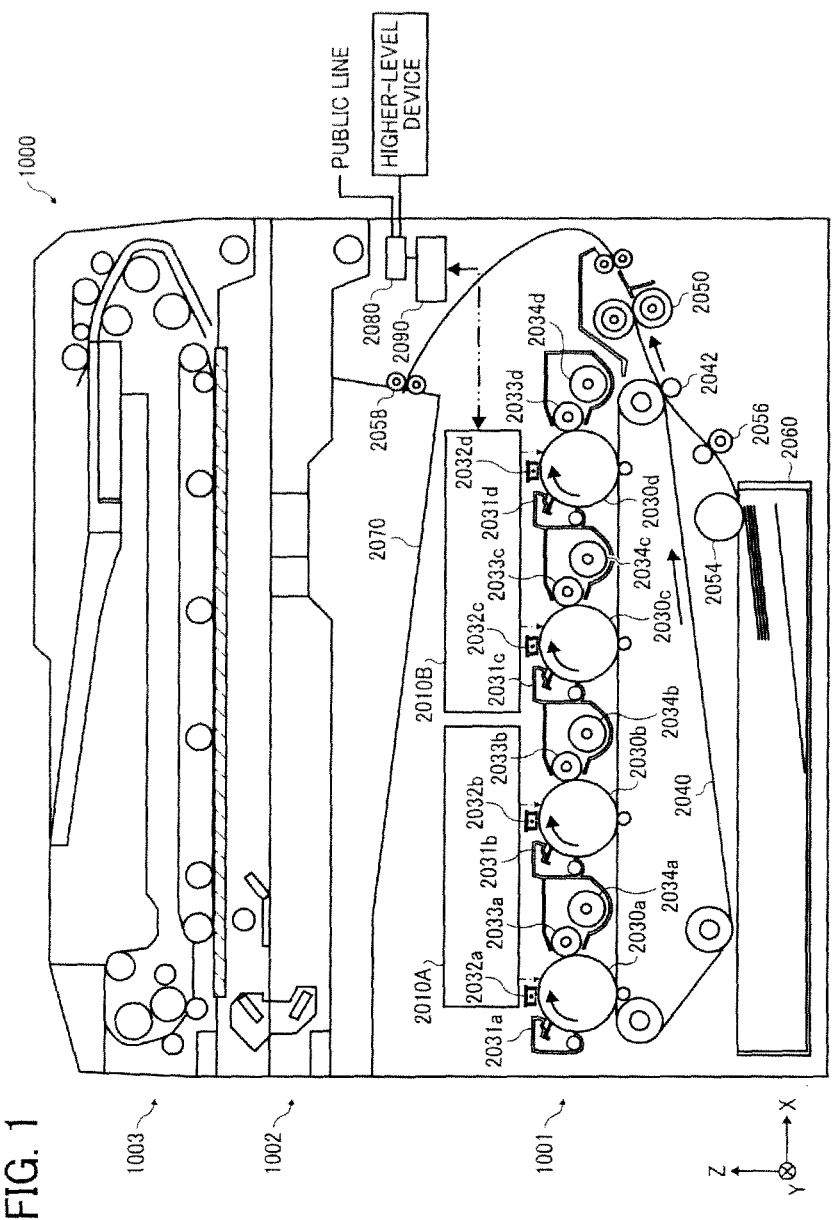
FIG. 1 is a schematic diagram of the configuration of an MFP (Multifunction Product) according to a first embodiment of the present invention.

A first embodiment of the present invention is described below with reference to FIGS. 1 to 17. FIG. 1 is a schematic diagram of the configuration of an MFP 1000. The MFP 1000 is an image forming apparatus according to the first embodiment.

The MFP 1000 has a copying function, a printer function, and a facsimile function. The MFP 1000 includes a main device 1001, a reading device 1002, an automatic document feeder (ADF) 1003, etc.

The main device 1001 is a tandem-type multicolor printer that forms a full-color image by superimposing four (black, cyan, magenta, and yellow) images on each other. The main device 1001 includes two optical scanners (2010A and 2010B), four photosensitive drums (2030*a*, 2030*b*, 2030*c*, and 2030*d*), four cleaning units (2031*a*, 2031*b*, 2031*c*, and 2031*d*), four charging devices (2032*a*, 2032*b*, 2032*c*, and 2032*d*), four developing rollers (2033*a*, 2033*b*, 2033*c*, and 2033*d*), four toner cartridges (2034*a*, 2034*b*, 2034*c*, and 2034*d*), a transfer belt 2040, a transfer roller 2042, a fixing roller 2050, a paper feed roller 2054, a pair of registration rollers 2056, a pair of paper discharging rollers 2058, a paper feed tray 2060, a paper discharge tray 2070, a communication control device 2080, a printer control device 2090 that controls the above devices, etc.

In the following, it is assumed that, in an XYZ three-dimensional orthogonal coordinate system, the longitudinal direction of each photosensitive drum is the Y-axis direction and the arrangement direction of the four photosensitive drums is the X-axis direction.

The reading device 1002 is disposed above (the +Z side) the main device 1001 and reads an original. In other words, the reading device 1002 is something known as a scanner. The scanned original image data is sent to the printer control device 2090 of the main device 1001.

The ADF 1003 is disposed above (the +Z side) the reading device 1002 and feeds a placed original toward the reading device 1002. The ADF 1003 is called, in general, an automatic document feeder (ADF).

The communication control device 2080 controls bidirectional communications that are made with a higher-level device (e.g., a personal computer) via a network, and controls data communications via a public line.

Each of the photosensitive drums has a surface on which a photosensitive layer is formed. The surface of each of the photosensitive drum is a subject to be scanned. Each of the photosensitive drum is rotated by a rotating mechanism (not illustrated) in the direction indicated by the arrow illustrated in FIG. 1.

In the vicinity of the surface of the photosensitive drum 2030*a*, the charging device 2032*a*, the developing roller 2033*a*, and the cleaning unit 2031*a* are arranged along the rotational direction of the photosensitive drum 2030*a*.

The photosensitive drum 2030*a*, the charging device 2032*a*, the developing roller 2033*a*, the toner cartridge 2034*a*, and the cleaning unit 2031*a* are used as a set and constitute an image forming station that forms black images (hereinafter, may be referred as "K station" for the sake of convenience).

In the vicinity of the surface of the photosensitive drum 2030*b*, the charging device 2032*b*, the developing roller 2033*b*, and the cleaning unit 2031*b* are arranged along the rotational direction of the photosensitive drum 2030*b*.

The photosensitive drum 2030*b*, the charging device 2032*b*, the developing roller 2033*b*, the toner cartridge 2034*b*, and the cleaning unit 2031*b* are used as a set, and constitutes an image forming station that forms cyan images (hereinafter, may be referred as "C station" for the sake of convenience).

In the vicinity of the surface of the photosensitive drum 2030*c*, the charging device 2032*c*, the developing roller 2033*c*, and the cleaning unit 2031*c* are arranged along the rotational direction of the photosensitive drum 2030*c*.

The photosensitive drum 2030*c*, the charging device 2032*c*, the developing roller 2033*c*, the toner cartridge 2034*c*, and the cleaning unit 2031*c* are used as a set and constitute an image forming station that forms magenta images (hereinafter, may be referred as "M station" for the sake of convenience).

In the vicinity of the surface of the photosensitive drum 2030*d*, the charging device 2032*d*, the developing roller 2033*d*, and the cleaning unit 2031*d* are arranged along the rotating direction of the photosensitive drum 2030*d*.

The photosensitive drum 2030*d*, the charging device 2032*d*, the developing roller 2033*d*, the toner cartridge 2034*d*, and the cleaning unit 2031*d* constitute an image forming station that forms yellow images (hereinafter, may be referred as "Y station" for the sake of convenience).

Each charging device evenly charges the surface of the corresponding photosensitive drum.

The printer control device 2090 analyzes image data that has been received from the reading device 1002 or image data that has been received via the communication control device 2080, and outputs black image data and cyan image data to the optical scanner 2010A and magenta image data and yellow image data to the optical scanner 2010B.

The optical scanner 2010A illuminates the surface of the charged photosensitive drum 2030*a* with a luminous flux that has been modulated in accordance with the black image data coming from the printer control device 2090 and illuminates the surface of the charged photosensitive drum 2030*b* with a luminous flux that has been modulated in accordance with the cyan image data.

The optical scanner 2010B illuminates the surface of the charged photosensitive drum 2030*c* with a luminous flux that has been modulated in accordance with the magenta image data coming from the printer control device 2090 and illuminates the surface of the charged photosensitive drum 2030*d* with a luminous flux that has been modulated in accordance with the yellow image data.

Therefore, electric charge for a part of the surface of each photosensitive drum that is illuminated with light exclusively disappears, and thus a latent image is formed on the surface of each photosensitive drum in accordance with the image data. The formed latent image is moved toward the developing roller by rotation of the photosensitive drum. The configuration of each optical scanner will be described later.

The toner cartridge 2034*a* accommodates black toner and the black toner is supplied to the developing roller 2033*a*. The toner cartridge 2034*b* accommodates cyan toner and the cyan toner is supplied to the developing roller 2033*b*. The toner cartridge 2034*c* accommodates magenta toner and the magenta toner is supplied to the developing roller 2033*c*. The toner cartridge 2034*d* accommodates yellow toner and the yellow toner is supplied to the developing roller 2033*d*.

In accordance with rotation of the developing rollers, the surface of each developing rollers is covered evenly and thinly with the toner supplied from the corresponding toner cartridge. When the toner on the surface of each developing rollers comes into contact with the corresponding photosensitive drum, the toner transfers to only the part of the surface of the corresponding photosensitive drum illuminated with the light and attached to the part. Each of the developing rollers attaches toner to the latent image that is formed on the surface of the corresponding photosensitive drum, and thus forms a visible image. The image to which toner is attached (toner image) is then conveyed toward the transfer belt 2040 by rotation of the photosensitive drum.

The yellow toner image, the magenta toner image, the cyan toner image, and the black toner image are sequentially transferred onto the transfer belt 2040 at a predetermined timing and superimposed and thus a color image is formed on the transfer belt 2040.

The paper feed tray 2060 accommodates recording sheets. The paper feed roller 2054 is disposed near the paper feed tray 2060. The paper feed roller 2054 picks up recording sheets one by one from the paper feed tray 2060 and conveys the recording sheets to the pair of registration rollers 2056. The pair of registration rollers 2056 conveys the recording sheet toward the gap between the transfer belt 2040 and the transfer roller 2042 at a predetermined timing. Thus the color image on the transfer belt 2040 is transferred onto the recording sheet. The recording sheet onto which the color image is transferred is conveyed to the fixing roller 2050.

Heat and pressure is applied to the recording sheet at the fixing roller 2050 and thus the toner is fixed onto the recording sheet. The recording sheet on which the toner fixed is conveyed to the discharge tray 2070 via the discharging rollers 2058 and then stacked on the discharge tray 2070 sequentially.

Each of the cleaning devices removes toner that remains on the surface of the corresponding photosensitive drum (residual toner). After the residual toner is removed from the surface of the photosensitive drum, the surface with no residual toner returns to the position to face the corresponding charging device.

The configuration of the optical scanner 2010A will be described below.

Figure 2:
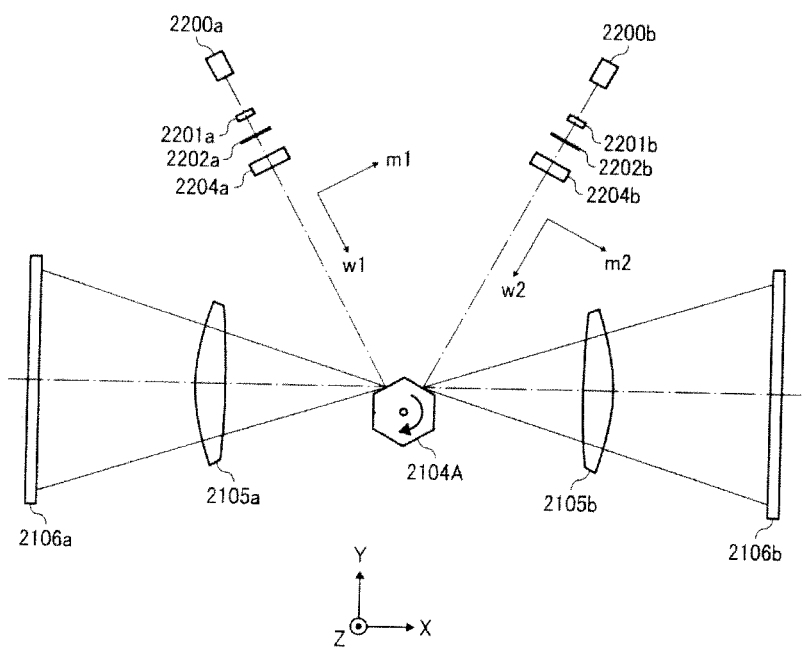
FIG. 2 is a first schematic diagram of the configuration of the optical scanner 2010A illustrated in FIG. 1.
Figure 3:
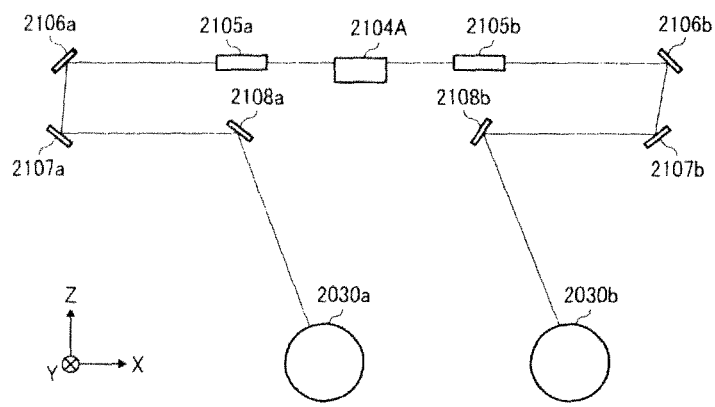
FIG. 3 is a second schematic diagram of the configuration of the optical scanner 2010A illustrated in FIG. 1.

As illustrated in FIGS. 2 and 3 as an example, the optical scanner 2010A includes, two light sources (2200*a* and 2200*b*), two coupling lenses (2201*a* and 2201*b*), two aperture plates (2202*a* and 2202*b*), two cylindrical lenses (2204*a* and 2204*b*), a polygon mirror 2104A, two scanning lenses (2105*a* and 2105*b*), six reflecting mirrors (2106*a*, 2106*b*, 2107*a*, 2107*b*, 2108*a*, and 2108*b*), and a scanning control device (not illustrated), etc. The above described components are assembled to predetermined positions of an optical-system housing (not illustrated).

It is assumed that the optical axis direction of the coupling lens 2201*a* is "direction w1" and the optical axis direction of the coupling lens 2201*b* is "direction w2". Moreover, it is assumed that the direction orthogonal to both the Z-axis direction and the direction w1 is "direction m1" and the direction orthogonal to both the Z-axis direction and the direction w2 is "direction m2".

Moreover, for the sake of convenience, hereinafter, a direction that corresponds to the main-scanning direction is described as "main-scanning corresponding direction" and a direction that corresponds to the sub-scanning direction is described as "sub-scanning corresponding direction".

The main-scanning corresponding direction at the light source 2200*a* is the direction m1; the main-scanning corresponding direction at the light source 2200*b* is the direction m2. The sub-scanning corresponding direction at the light source 2200*a* and the sub-scanning corresponding direction at the light source 2200*b* are the same with the Z-axis direction.

The light source 2200*a* and the light source 2200*b* are disposed apart from each other with respect to the X-axis direction.

Figure 4:
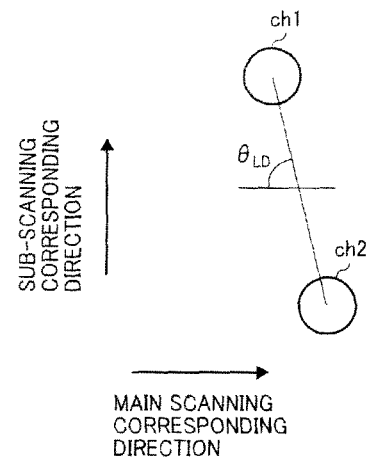
FIG. 4 is a schematic diagram of an LD array.

Each light source includes, as illustrated in FIG. 4 for example, an LD array on which two light-emitting elements (ch1 and ch2) are arranged in such a manner that the distance between their centers is 30 μm. The oscillation wavelength of each light-emitting element is 780 nm. When the two light-emitting elements are arranged horizontally, the angle of divergence of the emitted luminous flux is 19° (full width at half maximum) in the horizontal direction and 9° (full width at half maximum) in the vertical direction.

The two light-emitting elements are arranged so that a line that connects the centers of the two light-emitting elements makes a certain angle (angle $\theta_{LD}$) with respect to the main-scanning corresponding direction. In this example, $\theta_{LD}=76.15°$. With this configuration, the interval of beams is 21.1 μm on the photosensitive drum in the sub-scanning direction, which is compatible with the writing density of 1200 dpi.

The coupling lens 2201*a* is disposed on the optical path of a luminous flux emitted from the light source 2200*a* and converts the luminous flux into a substantially parallel luminous flux.

The coupling lens 2201*b* is disposed on the optical path of a luminous flux emitted from the light source 2200*b* and converts the luminous flux into a substantially parallel luminous flux.

Each coupling lens is made of glass and the refractive index thereof is 1.6935 and the focal distance thereof is 27 mm.

The aperture plate 2202*a* has an aperture and shapes the luminous flux that has passed through the coupling lens 2201*a*.

The aperture plate 2202*b* has an aperture and shapes the luminous flux that has passed through the coupling lens 2201*b*.

The shape of aperture of each aperture plate is rectangular or ellipse having the width 3.0 mm in the main-scanning corresponding direction and the length 2.34 mm in sub-scanning corresponding direction. The center of the aperture of each aperture plate is disposed so as to be positioned in the vicinity of the focus position of the corresponding coupling lens.

The cylindrical lens 2204a causes the luminous flux that has passed through the aperture of the aperture plate 2202a to form an image near a deflecting/reflecting surface of the polygon mirror 2104A in the Z-axis direction.

The cylindrical lens 2204b causes the luminous flux that has passed through the aperture of the aperture plate 2202b to form an image near the deflecting/reflecting surface of the polygon mirror 2104A in the Z-axis direction.

Each cylindrical lens is made of glass and the refractive index thereof is 1.5168 and the focal distance thereof is 93.3 mm.

The optical system disposed on the optical path between the light source and the polygon mirror 2104A may be called "pre-deflector optical system". The pre-deflector optical system for the K station includes, in this example, the coupling lens 2201a, the aperture plate 2202a, and the cylindrical lens 2204a. The pre-deflector optical system for the C station includes the coupling lens 2201b, the aperture plate 2202b, and the cylindrical lens 2204b.

The polygon mirror 2104A is a regular hexagon member inscribed in a circle that has a radius 16 mm on an XY cross-section. A deflecting/reflecting surface is formed on each of the six sides of the polygon mirror 2104A. The polygon mirror 2104A is rotated by a rotating mechanism (not illustrated) about an axis parallel to the Z axis at a constant angular speed.

In this example, the luminous flux coming from the cylindrical lens 2204a is deflected toward the −X side of the polygon mirror 2104A; the luminous flux coming from the cylindrical lens 2204b is deflected toward the +X side of the polygon mirror 2104A.

The scanning lens 2105a is on the −X side of the polygon mirror 2104A; the scanning lens 2105b is on the +X side of the polygon mirror 2104A.

Each scanning lens is a molded resin product and the refractive index thereof is 1.530 and the center (on the optical axis) thickness thereof is 21.05 mm. Optical surfaces (the input surface and the output surface) of each scanning lens are aspheric surfaces given by the following equations (1) and (2), in which X is a coordinate in the X-axis direction and Y is a coordinate in the Y-axis direction. The center of the input surface is Y=0. $C_{m0}$ is the curvature in the main-scanning corresponding direction when Y=0. $C_{m0}$ is a reciprocal of the radius of curvature $R_m$. $a_{00}, a_{01}, a_{02}, \ldots$ are aspheric-surface coefficients in the main-scanning corresponding direction. Cs (Y) is the curvature of Y in the sub-scanning corresponding direction; $R_{a0}$ is the radius of curvature on the optical axis in the sub-scanning corresponding direction; $b_{00}, b_{01}, b_{02}, \ldots$ are aspheric surface coefficients in the sub-scanning corresponding direction. The optical axis is an axis that passes the center point in the sub-scanning corresponding direction, when Y=0.

$$X(Y) = \frac{C_{m0} \cdot Y^2}{1 + \sqrt{1 - (1 + a_{00}) \cdot C_{m0}^2 \cdot Y^2}} + \quad (1)$$
$$a_{01} \cdot Y + a_{02} \cdot Y^2 + a_{03} \cdot Y^3 + a_{04} \cdot Y^4 + \ldots$$

$$Cs(Y) = \frac{1}{R_{S0}} + b_{01} \cdot Y + b_{02} \cdot Y^2 + b_{03} \cdot Y^3 + \ldots \quad (2)$$

Examples of the values of $R_m$, $R_{s0}$, and the aspheric surface coefficients of the both surfaces (the input surface (first surface) and the output surface (second surface)) of each scanning lens are listed on the table of FIG. 5. The input surface (first surface) of the scanning lens has, in terms of the sub-scanning corresponding direction, the curvature unchanged with respect to the lens height.

Because each scanning lens is a molded resin product, birefringence occurs when a luminous flux passes through each scanning lens. It is assumed, in this example to make the description simpler, that the birefringence magnitude is represented by both the phase shift 0.4λ and the optical-axis shift 5°. This birefringence occurs evenly with this birefringence magnitude, regardless of the position of incidence. As a result, even if linearly polarized light is input to the scanning lens, elliptically polarized light is output from the scanning lens. It is noted that even if the birefringence magnitude of each scanning lens is unequal, the present embodiment can bring the same effects.

Referring back to FIG. 3, after the luminous flux coming from the cylindrical lens 2204a is deflected by the polygon mirror 2104A, the deflected luminous flux passes through the scanning lens 2105a, the reflecting mirror 2106a, the reflecting mirror 2107a, and the reflecting mirror 2108a and then illuminates the photosensitive drum 2030a, thereby forming a spot of light. The spot of light moves in the longitudinal direction of the photosensitive drum 2030a in accordance with rotation of the polygon mirror 2104A. That is, the spot of light scans the photosensitive drum 2030a. The moving direction of the spot of light is "the main-scanning direction" at the photosensitive drum 2030a. The rotating direction of the photosensitive drum 2030a is "the sub-scanning direction" at the photosensitive drum 2030a.

The luminous flux coming from the cylindrical lens 2204b is deflected by the polygon mirror 2104A, and the deflected luminous flux passes through the scanning lens 2105b, the reflecting mirror 2106b, the reflecting mirror 2107b, and the reflecting mirror 2108b and then illuminates the photosensitive drum 2030b, thereby forming a spot of light. The spot of light moves in the longitudinal direction of the photosensitive drum 2030b in accordance with rotation of the polygon mirror 2104A. Thus, the photosensitive drum 2030b is scanned. The moving direction of the spot of light is "the main-scanning direction" at the photosensitive drum 2030b. The rotating direction of the photosensitive drum 2030b is "the sub-scanning direction" at the photosensitive drum 2030b.

Each of the reflecting mirrors is arranged so that the length of the optical path from the polygon mirror 2104A to each photosensitive drum is equal to each other, and also the position of incidence and the angle of incidence are respectively equal to each other.

Each of the reflecting mirrors are arranged so that the optical paths from the polygon mirror 2104A toward each photosensitive drum do not intersect each other, when viewed from the Y-axis direction.

The reflecting mirror 2106a is coated with a single layer of $MgF_2$ (film thickness 391 nm). The reflecting mirror 2107a and the reflecting mirror 2108a are coated with triple layers of $MgF_2$ (195 nm)+$TiO_2$ (195 nm)+$MgF_2$ (195 nm).

In the same manner, the reflecting mirror 2106b is coated with a single layer of $MgF_2$ (film thickness 391 nm). The reflecting mirror 2107b and the reflecting mirror 2108b are coated with triple layers of $MgF_2$ (195 nm)+$TiO_2$ (195 nm)+$MgF_2$ (195 nm).

As the number of dielectric coating layers increases, the reflectance increases and a variation in the reflectance that depends on the angle of incidence decreases.

The optical system disposed on the optical path between the polygon mirror 2104A and each photosensitive drum may be called "optical scanning system". In the present embodiment, the optical scanning system for the K station includes the scanning lens 2105a and the three reflecting mirrors (2106a, 2107a, and 2108a). The optical scanning system for the C station includes the scanning lens 2105b and the three reflecting mirrors (2106b, 2107b, and 2108b).

Figure 6:
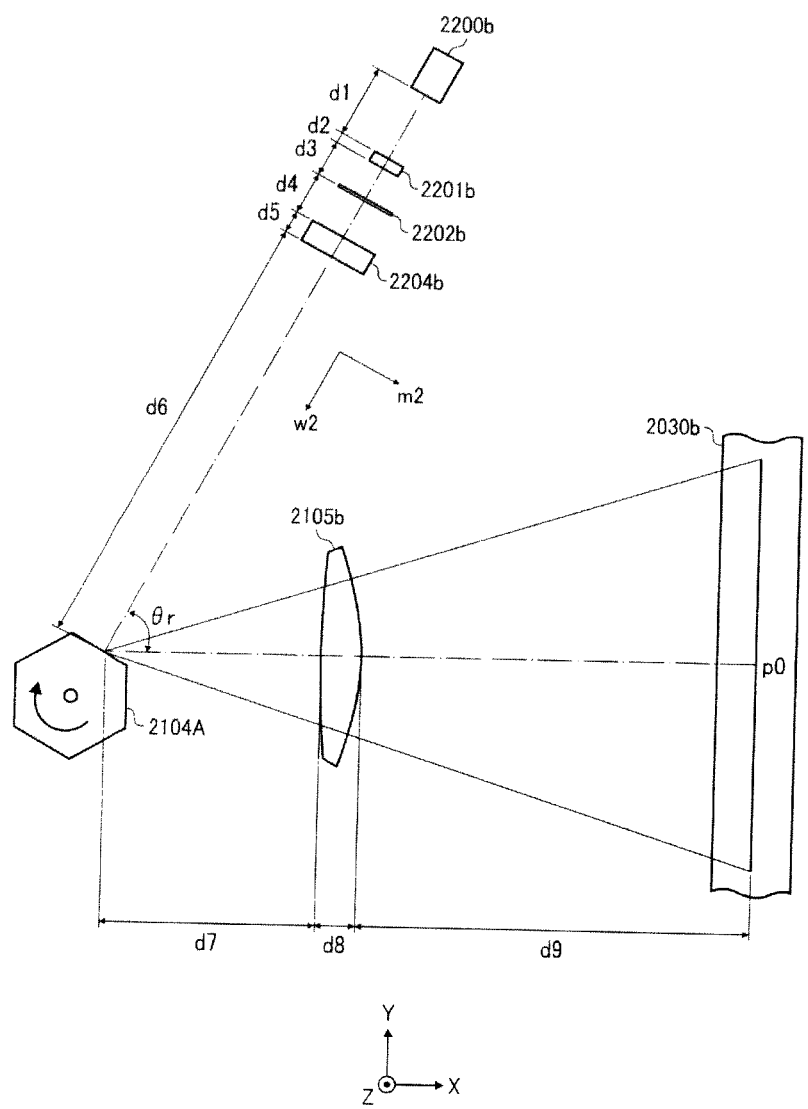
FIG. 6 is a schematic diagram that illustrates the positional relation among the main optical elements.
Figures 7, 8:
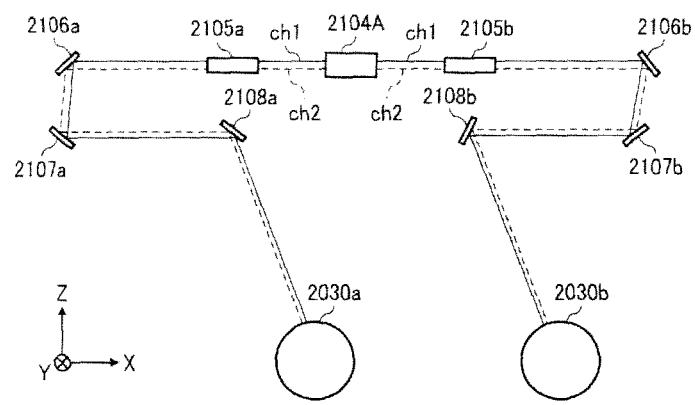
FIG. 7 is a table of examples of the values of d1 to d9 illustrated in FIG. 6.
FIG. 8 is a schematic diagram of an optical path of a luminous flux emitted from ch1 and an optical path of a luminous flux emitted from ch2 that are reflected by the reflecting mirrors.

FIG. 6 illustrates an example of the positional relation among the main optical elements of the pre-deflector optical system and the optical scanning system for the C station. Examples of the concrete values (unit: mm) of the reference numerals d1 to d9 illustrated in FIG. 6 are illustrated in FIG. 7. The other stations have the similar positional relations.

The direction of the luminous flux output from the cylindrical lens 2204b makes an angle 60° (angle θr illustrated in FIG. 6) with the traveling direction of the luminous flux that is deflected/reflected by the deflecting/reflecting surface of the polygon mirror 2104A toward a position of the image height 0 on the surface of the photosensitive drum 2030b (position p0 illustrated in FIG. 6).

The lateral magnification of the entire optical system is −6.07-fold in the sub-scanning corresponding direction, and the lateral magnification of only the optical scanning system is −1.63-fold.

The angle of inclination of each reflecting mirror is described below.

As described above two luminous fluxes are deflected by the polygon mirror 2104A: one luminous flux, illustrated in FIG. 8 for example, on the +Z side is the luminous flux emitted from ch1 (for convenience hereinafter, "luminous flux ch1") and the other luminous flux on the −Z side is the luminous flux emitted from ch2 (for convenience hereinafter, "luminous flux ch2").

Figure 9:
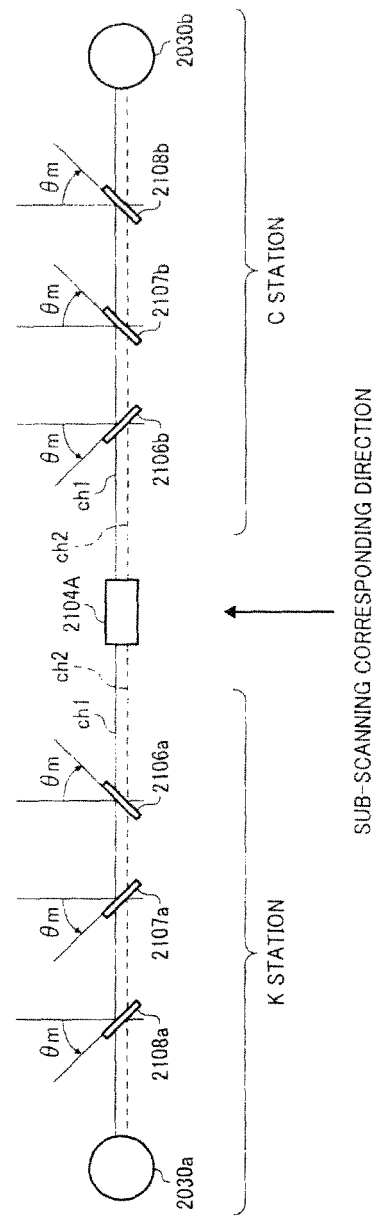
FIG. 9 is a schematic diagram of the optical paths represented as straight horizontal lines so as to illustrate the direction toward which each reflecting mirror is inclined.
Figures 10, 11:
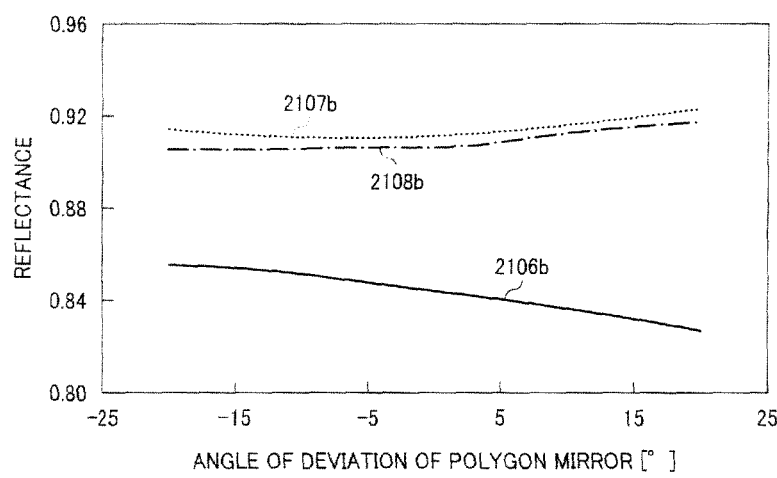
FIG. 10 is a table of the angle of inclination of each reflecting mirror with respect to the light beam.
FIG. 11 is a graph that illustrates the relation, where the luminous flux emitted from the light source is first polarized light, between the reflectance of each reflecting mirror and the angle of deviation of the polygon mirror.

FIG. 8 is horizontally developed so that the light beam ch1 is positioned above the light beam ch2 as illustrated in FIG. 9. Angles of inclination θm are illustrated in FIG. 10, where θm is the angle between each reflecting mirror and a direction orthogonal to the optical path of the luminous flux. When the reflecting mirrors are inclined toward the polygon mirror, θm is positive. When the reflecting mirrors are inclined toward the photosensitive drums, θm is negative.

The three reflecting mirrors (2106b, 2107b, and 2108b) of the optical scanning system for the C station are described below.

FIG. 11 illustrates the relation, where the direction of polarization of the luminous flux emitted from the light source is parallel to the sub-scanning corresponding direction, between the angle of deviation (°) of the luminous flux deflected by the polygon mirror and the reflectances of the deflected luminous flux reflected by the three reflecting mirrors (2106b, 2107b, and 2108b). In the present specification, when the luminous flux is deflected by the polygon mirror toward the position of the image height 0 on the photosensitive drum, the angle of deviation is assumed to be 0(°).

Figure 12:
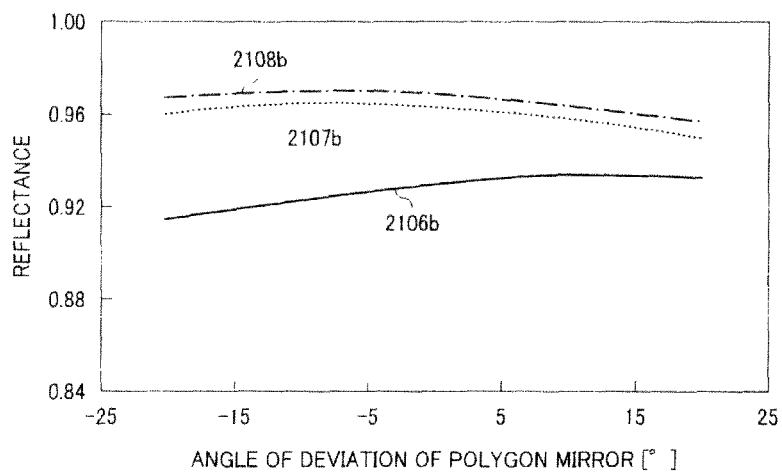
FIG. 12 is a graph that illustrates the relation, where the luminous flux emitted from the light source is second polarized light, between the reflectance of each reflecting mirror and the angle of deviation of the polygon mirror.

FIG. 12 illustrates the relation, where the direction of polarization of the luminous flux emitted from the light source is parallel to the main-scanning corresponding direction, between the angle of deviation (°) of the luminous flux deflected by the polygon mirror and the reflectances of the deflected luminous flux reflected by the three reflecting mirrors (2106b, 2107b, and 2108b).

In the following, to make the description simpler, a light beam having the direction of polarization parallel to the sub-scanning corresponding direction may be called "first polarized light" and a light beam having the direction of polarization parallel to the main-scanning corresponding direction may be called "second polarized light".

In the reflecting mirror, "the reflectance when the luminous flux emitted from the light source is the second polarized light" divided by "the reflectance when the luminous flux emitted from the light source is the first polarized light" is called "reflectance ratio".

Figure 13:
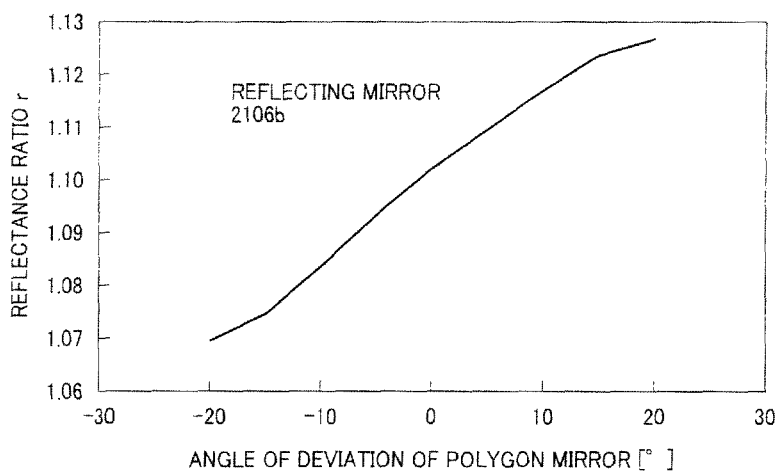
FIG. 13 is a graph that illustrates the relation between the reflectance ratio of the reflecting mirror 2106b and the angle of deviation of the polygon mirror.

FIG. 13 illustrates the relationship between the reflectance ratio r of the reflecting mirror 2106b and the angle of deviation θp (°) of the polygon mirror.

Figure 14:
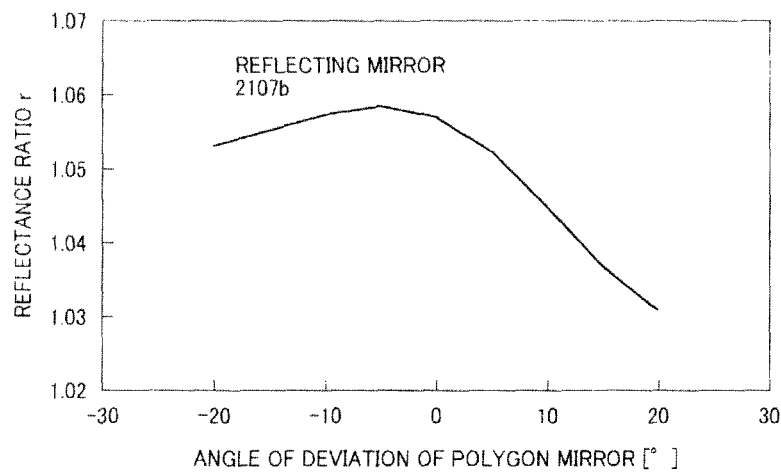
FIG. 14 is a graph that illustrates the relation between the reflectance ratio of the reflecting mirror 2107b and the angle of deviation of the polygon mirror.

FIG. 14 illustrates the relationship between the reflectance ratio r of the reflecting mirror 2107b and the angle of deviation θp (°) of the polygon mirror.

Figure 15:
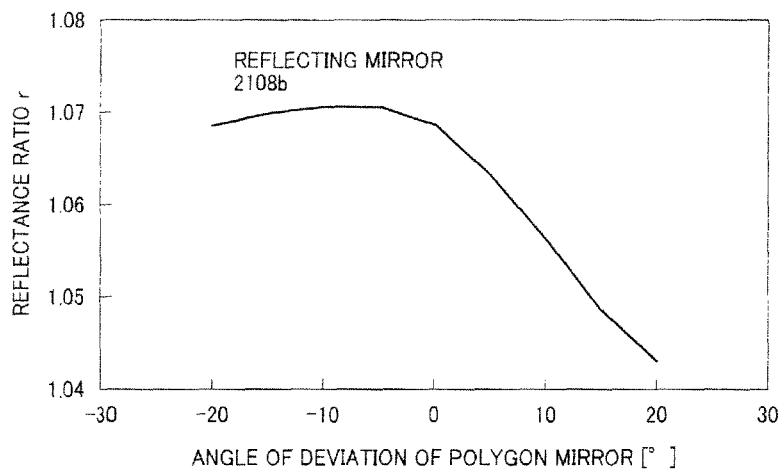
FIG. 15 is a graph that illustrates the relation between the reflectance ratio of the reflecting mirror 2108*b* and the angle of deviation of the polygon mirror.

FIG. 15 illustrates the relationship between the reflectance ratio r of the reflecting mirror 2108b and the angle of deviation θp (°) of the polygon mirror.

The luminous flux deflected by the polygon mirror at the angle of deviation θp−20° is the luminous flux that travels toward the scanning start position of the photosensitive drum, and the reflectance ratio of this luminous flux is denoted by r(−20). The luminous flux deflected by the polygon mirror at the angle of deviation θp+20° is the luminous flux that travels toward the scanning end position of the photosensitive drum. The reflectance ratio of this luminous flux is denoted by r(+20).

With reference to FIGS. 13 to 15, as for the magnitude relation between r(−20) and r(+20), the reflecting mirror 2106b satisfies r(−20)<r(+20), the reflecting mirror 2107b satisfies r(−20)>r(+20), and the reflecting mirror 2108b satisfies r(−20)>r(+20). In other words, when comparing the three reflecting mirrors (2106b, 2107b, and 2108b) with each other, the reflecting mirror 2106b spas the inverse magnitude relation to the magnitude relation of the other reflecting mirrors (2107b and 2108b).

The difference between the maximum value and the minimum value of the reflectance ratio r is 0.057 in the reflecting mirror 2106b; 0.028 in the reflecting mirror 2107b; and 0.027 in the reflecting mirror 2108b. In other words, the reflecting mirror 2106b has the largest difference among the three reflecting mirrors (2106b, 2107b, and 2108b). This is because the reflecting mirror 2106b is coated with a single layer, while the other reflecting mirrors (2107b and 2108b) are not.

The light use efficiency of the optical scanning system may be expressed by the product of the reflectances of the three reflecting mirrors.

When the scanning lens causes different birefringence depending on the position of the incident light, if the three reflecting mirrors are coated in the same manner, the light use efficiency varies depending on the position of incidence (image height), i.e. The deviation of the light use efficiency between the image heights increases, and thus the output images having uneven density are formed. However in the first embodiment, the reflecting mirror 2106b is coated in such a manner that the deviation, due to the difference in the polarized state, of the light use efficiency between the image heights increases; therefore, even when the polarized state of light input to the optical scanning system varies, the deviation of the light use efficiency between the image heights may decrease for the entire optical scanning system.

The three reflecting mirrors (2106a, 2107a, and 2108a) of the optical scanning system for the K station will be described below.

As for the magnitude relation between r(−20) and r(+20), the reflecting mirror 2106a satisfies r(−20)<r(+20), the reflecting mirror 2107a satisfies r(−20)>r(+20), and the reflecting mirror 2108a satisfies r(−20)>r(+20). In other words, when comparing the three reflecting mirrors (2106a, 2107a, and 2108a) with each other, the reflecting mirror 2106a has the inverse magnitude relation to the magnitude relation of the other reflecting mirrors (2107a and 2108a).

Moreover, as for the difference between the maximum value and the minimum value of the reflectance ratio r, the reflecting mirror 2106a has the largest difference among the three reflecting mirrors (2106a, 2107a, and 2108a). This is because the reflecting mirror 2106a is coated with a single layer, while the other reflecting mirrors (2107a and 2108a) are not.

The configuration of the optical scanner 2010B is described below.

Figure 16:
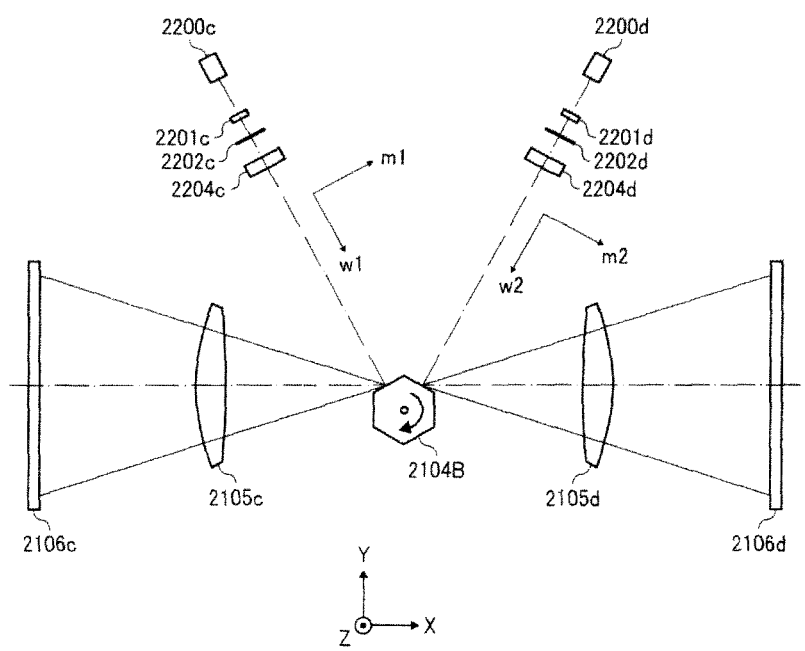
FIG. 16 is a first schematic diagram of the configuration of the optical scanner 2010B illustrated in FIG. 1.
Figure 17:
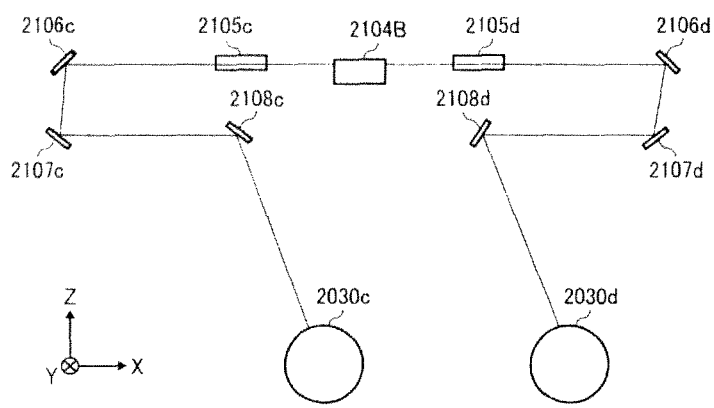
FIG. 17 is a second schematic diagram of the configuration of the optical scanner 2010B illustrated in FIG. 1.

As illustrated in FIGS. 16 and 17 as an example, the optical scanner 2010B includes, two light sources (2200c and 2200d), two coupling lenses (2201c and 2201d), two aperture plates (2202c and 2202d), two cylindrical lenses (2204c and 2204d), a polygon mirror 2104B, two scanning lenses (2105c and 2105d), six reflecting mirrors (2106c, 2106d, 2107c, 2107d, 2108c, and 2108d), and a scanning control device (not illustrated), etc. These components are assembled to predetermined positions of an optical-system housing (not illustrated).

The light sources 2200c and 2200d are similar to those light sources of the optical scanner 2010A. The main-scanning corresponding direction and the sub-scanning corresponding direction at the light source 2200c are the same as the main-scanning corresponding direction and the sub-scanning corresponding direction at the light source 2200a, respectively. The main-scanning corresponding direction and the sub-scanning corresponding direction at the light source 2200d are the same as the main-scanning corresponding direction and the sub-scanning corresponding direction at the light source 2200b, respectively.

The coupling lens 2201c is disposed on the optical path of a luminous flux emitted from the light source 2200c and converts the luminous flux into a substantially parallel luminous flux.

The coupling lens 2201d is disposed on the optical path of a luminous flux emitted from the light source 2200d and converts the luminous flux into a substantially parallel luminous flux.

Each coupling lens is made of glass whose refractive index is 1.6935 and the focal distance is 27 mm.

The aperture plate 2202c has an aperture and shapes the luminous flux that has passed through the coupling lens 2201c.

The aperture plate 2202d has an aperture and shapes the luminous flux that has passed through the coupling lens 2201d.

The aperture of each aperture plate is in a shape of ellipse or rectangular having the width 3.0 mm in the main-scanning corresponding direction and the length 2.34 mm in sub-scanning corresponding direction. Each aperture plate is arranged in such a manner that the center of each aperture plate is positioned in the vicinity of the focus position of the corresponding coupling lens.

The cylindrical lens 2204c causes the luminous flux that has passed through the aperture of the aperture plate 2202c to form an image near a deflecting/reflecting surface of the polygon mirror 2104B in the Z-axis direction.

The cylindrical lens 2204d causes the luminous flux that has passed through the aperture of the aperture plate 2202d to form an image near a deflecting/reflecting surface of the polygon mirror 2104B in the Z-axis direction.

Each cylindrical lens is made of glass whose refractive index is 1.5168 and the focal distance is 93.3 mm.

The optical system disposed on the optical path between the light source and the polygon mirror 2104B may be called "pre-deflector optical system". The pre-deflector optical system for the M station includes, in this example, the coupling lens 2201c, the aperture plate 2202c, and the cylindrical lens 2204c. The pre-deflector optical system for the Y station includes the coupling lens 2201d, the aperture plate 2202d, and the cylindrical lens 2204d.

The polygon mirror 2104B has a similar configuration to that of the polygon mirror 2104A included in the above described optical scanner 2010A.

The luminous flux coming from the cylindrical lens 2204c is deflected toward the −X side of the polygon mirror 2104B; the luminous flux coming from the cylindrical lens 2204d is deflected toward the +X side of the polygon mirror 2104B.

The scanning lens 2105c is disposed on the −X side of the polygon mirror 2104B; the scanning lens 2105d is disposed on the +X side of the polygon mirror 2104B.

Each scanning lens is similar to the scanning lens of the above described optical scanner 2010A.

The luminous flux coming from the cylindrical lens 2204c is deflected by the polygon mirror 2104B. The deflected luminous flux travels via the scanning lens 2105c, the reflecting mirror 2106c, the reflecting mirror 2107c, and the reflecting mirror 2108c and then illuminates the photosensitive drum 2030c, thereby forming a spot of light. The spot of light moves in the longitudinal direction of the photosensitive drum 2030c in accordance with rotation of the polygon mirror 2104B. Namely, the spot of light scans the photosensitive drum 2030c. The moving direction of the spot of light is "the main-scanning direction" at the photosensitive drum 2030c. The rotating direction of the photosensitive drum 2030c is "the sub-scanning direction" at the photosensitive drum 2030c.

The luminous flux coming from the cylindrical lens 2204d is deflected by the polygon mirror 2104B. The deflected luminous flux travels via the scanning lens 2105d, the reflecting mirror 2106d, the reflecting mirror 2107d, and the reflecting mirror 2108d and then illuminates the photosensitive drum 2030d, thereby forming a spot of light. The spot of light moves in the longitudinal direction of the photosensitive drum 2030d in accordance with rotation of the polygon mirror 2104B. Namely, the spot of light scans the photosensitive drum 2030d. The moving direction of the spot of light is "the main-scanning direction" at the photosensitive drum 2030d. The rotating direction of the photosensitive drum 2030d is "the sub-scanning direction" at the photosensitive drum 2030d.

Each reflecting mirror is arranged so that the length of the optical path from the polygon mirror 2104B to each photosensitive drum is equal, and the position of incidence and the angle of incidence are equal each other.

Each reflecting mirror is arranged so that the optical path from the polygon mirror 2104B toward each photosensitive drum does not intersect, when viewed from the Y-axis direction.

The reflecting mirror 2106c is coated with a single layer of $MgF_2$ (film thickness 391 nm). The reflecting mirror 2107c and the reflecting mirror 2108c are coated with triple layers of $MgF_2$ (195 nm)+$TiO_2$ (195 nm)+$MgF_2$ (195 nm).

Likewise, the reflecting mirror 2106d is coated with a single layer of $MgF_2$ (film thickness 391 nm). The reflecting mirror 2107d and the reflecting mirror 2108d are coated with triple layers of $MgF_2$ (195 nm)+$TiO_2$ (195 nm)+$MgF_2$ (195 nm).

As the number of dielectric coating layers increases, the reflectance increases and a change in the reflectance that depends on the angle of incidence decreases.

The optical system disposed on the optical path between the polygon mirror 2104B and each photosensitive drum may be called "optical scanning system". In the first embodiment, the optical scanning system for the M station includes the scanning lens 2105c and the three reflecting mirrors (2106c, 2107c, and 2108c). The optical scanning system for the Y station includes the scanning lens 2105d and the three reflecting mirrors (2106d, 2107d, and 2108d).

The three reflecting mirrors (2106c, 2107c, and 2108c) included in the optical scanning system for the M station are arranged in the similar posture and the similar positional relation as those of the three reflecting mirrors (2106a, 2107a, and 2108a) included in the optical scanning system for the K station.

As for the magnitude relation between r(−20) and r(+20) of each of the three reflecting mirrors (2106c, 2107c, and 2108c), the reflecting mirror 2106c satisfies r(−20)<r(+20), the reflecting mirror 2107c satisfies r(−20)>r(+20), and the reflecting mirror 2108c satisfies r(−20)>r(+20). In other words, when comparing the three reflecting mirrors (2106c, 2107c, and 2108c), the reflecting mirror 2106c has the inverse magnitude relation to the magnitude relation of the other reflecting mirrors (2107c and 2108c).

Moreover, as for the difference between the maximum value and the minimum value of the reflectance ratio r, the reflecting mirror 2106c has the largest difference among the three reflecting mirrors (2106c, 2107c, and 2108c). This is because the reflecting mirror 2106c is coated with a single layer, while the other reflecting mirrors (2107c and 2108c) are not.

The three reflecting mirrors (2106d, 2107d, and 2108d) included in the optical scanning system for the Y station are arranged in the similar posture and the similar positional relation as those of the three reflecting mirrors (2106b, 2107b, and 2108b) included in the optical scanning system of the C station.

As for the magnitude relation between r(−20) and r(+20) of each of the three reflecting mirrors (2106d, 2107d, and 2108d), the reflecting mirror 2106d satisfies r(−20)<r(+20), the reflecting mirror 2107d satisfies r(−20)>r(+20), and the reflecting mirror 2108d satisfies r(−20)>r(+20). In other words, when comparing the three reflecting mirrors (2106d, 2107d, and 2108d), the reflecting mirror 2106d has the inverse magnitude relation to the magnitude relation of the other reflecting mirrors (2107d and 2108d).

Moreover, as for the difference between the maximum value and the minimum value of the reflectance ratio r, the reflecting mirror 2106d has the largest difference among the three reflecting mirrors (2106d, 2107d, and 2108d). This is because the reflecting mirror 2106d is coated with a single layer, while the other reflecting mirrors (2107d and 2108d) are not.

As described above, the optical scanner 2010A according to the first embodiment includes the light sources (2200a and 2200b) each including an LD array having two light-emitting elements; the polygon mirror 2104A that deflects a luminous flux coming from each light source; the optical scanning system for the K station that collects the luminous flux coming from the light source 2200a and being deflected by the polygon mirror 2104A on the surface of the photosensitive drum 2030a; and the optical scanning system for the C station that collects the luminous flux coming from the light source 2200b and being deflected by the polygon mirror 2104A on the surface of the photosensitive drum 2030b.

The optical scanning system for the K station includes the resin scanning lens 2105a and the three reflecting mirrors (2106a, 2107a, and 2108a). As for the magnitude relation between the reflectance ratio of the luminous flux toward the scanning start position of the photosensitive drum 2030a and the reflectance ratio of the luminous flux toward the scanning end position, the reflecting mirror 2106a is set to have the inverse magnitude relation to the magnitude relation of the other reflecting mirrors (2107a and 2108a).

Moreover, regarding the difference between the maximum value and the minimum value of the reflectance ratio in the relationship between the angle of deviation of the polygon mirror 2104A and the reflectance ratio, the difference is set so as to become the largest at the reflecting mirror 2106a among the three reflecting mirrors (2106a, 2107a, and 2108a).

The reflecting mirror 2106a is coated with a single layer, while the reflecting mirrors 2107a and 2108a are coated with triple layers.

Moreover, the three reflecting mirrors (2106a, 2107a, and 2108a) are arranged so that the optical path from the polygon mirror 2104A toward the photosensitive drum 2030a does not intersect, when viewed from the Y-axis direction. The reflecting mirror 2106a is disposed in a closest position to the polygon mirror 2104A.

The optical scanning system for the C station includes the resin scanning lens 2105b and the three reflecting mirrors (2106b, 2107b, and 2108b). As for the magnitude relation between the reflectance ratio of the luminous flux toward the scanning start position of the photosensitive drum 2030b and the reflectance ratio of the luminous flux toward the scanning end position, the reflecting mirror 2106b is set to have the inverse magnitude relation to the magnitude relation of the other reflecting mirrors (2107b and 2108b).

Moreover, regarding the difference between the maximum value and the minimum value of the reflectance ratio in the relationship between the angle of deviation and the reflectance ratio of the polygon mirror 2104A, the difference is set so as to become the largest at the reflecting mirror 2106b among the three reflecting mirrors (2106b, 2107b, and 2108b).

The reflecting mirror 2106b is coated with a single layer, while the reflecting mirrors 2107b and 2108b are coated with triple layers.

Moreover, the three reflecting mirrors (2106b, 2107b, and 2108b) are arranged so that the optical path from the polygon mirror 2104A toward the photosensitive drum 2030b does not intersect, when viewed from the Y-axis direction. The reflecting mirror 2106b is disposed in a closest position to the polygon mirror 2104A.

With this configuration, the optical scanner 2010A can decrease variation in the intensity of light on the photosensitive drums 2030a and 2030b.

The optical scanner 2010B according to the first embodiment includes: the light sources (2200c and 2200d) each including an LD array having two light-emitting elements; the polygon mirror 2104B that deflects a luminous flux coming from each light source; the optical scanning system for the M station that collects the luminous flux coming from the light source 2200c and being deflected by the polygon mirror 2104B on the surface of the photosensitive drum 2030c; and the optical scanning system for the Y station that collects the luminous flux, coming from the light source 2200d and being deflected by the polygon mirror 2104B, on the surface of the photosensitive drum 2030d.

The optical scanning system for the M station includes the resin scanning lens 2105c and the three reflecting mirrors (2106c, 2107c, and 2108c). As for the magnitude relation between the reflectance ratio of the luminous flux toward the scanning start position of the photosensitive drum 2030c and the reflectance ratio of the luminous flux toward the scanning end position, the reflecting mirror 2106c is set to have the inverse magnitude relation to the magnitude relation of the other reflecting mirrors (2107c and 2108c).

Moreover, regarding the difference between the maximum value and the minimum value of the reflectance ratio in the relationship between the angle of deviation and the reflectance ratio of the polygon mirror 2104B, the difference is set so as to become the largest at the reflecting mirror 2106c among the three the three reflecting mirrors (2106c, 2107c, and 2108c).

The reflecting mirror 2106c is coated with a single layer, while the reflecting mirrors 2107c and 2108c are coated with triple layers.

Moreover, the three reflecting mirrors (2106c, 2107c, and 2108c) are arranged so that the optical path from the polygon mirror 2104B toward the photosensitive drum 2030c does not intersect, when viewed from the Y-axis direction. The reflecting mirror 2106c is disposed at a position closest to the polygon mirror 2104B.

The optical scanning system for the Y station includes the resin scanning lens 2105d and the three reflecting mirrors (2106d, 2107d, and 2108d). As for the magnitude relation between the reflectance ratio of the luminous flux toward the scanning start position of the photosensitive drum 2030d and the reflectance ratio of the luminous flux toward the scanning end position, the reflecting mirror 2106d is set to have the inverse magnitude relation to the magnitude relation of the other reflecting mirrors (2107d and 2108d).

Moreover, regarding the difference between the maximum value and the minimum value of the reflectance ratio in the relationship between the angle of deviation and the reflectance ratio of the polygon mirror 2104B, the difference is set so as to become the largest at the reflecting mirror 2106d among the three the three reflecting mirrors (2106d, 2107d, and 2108d).

The reflecting mirror 2106d is coated with a single layer, while the reflecting mirrors 2107d and 2108d are coated with triple layers.

Moreover, the three reflecting mirrors (2106d, 2107d, and 2108d) are arranged so that the optical path headed from the polygon mirror 2104B toward the photosensitive drum 2030d does not intersect, when viewed from the Y-axis direction. The reflecting mirror 2106d is disposed at a position closest to the polygon mirror 2104B.

With this configuration, the optical scanner 2010B can decrease variation in the intensity of light on the photosensitive drums 2030c and 2030d.

Because the MFP 1000 used in the first embodiment includes the optical scanners 2010A and 2010B, the MFP 1000 can be provided with a lower cost without decreasing the image quality.

Second Embodiment

Figure 18:
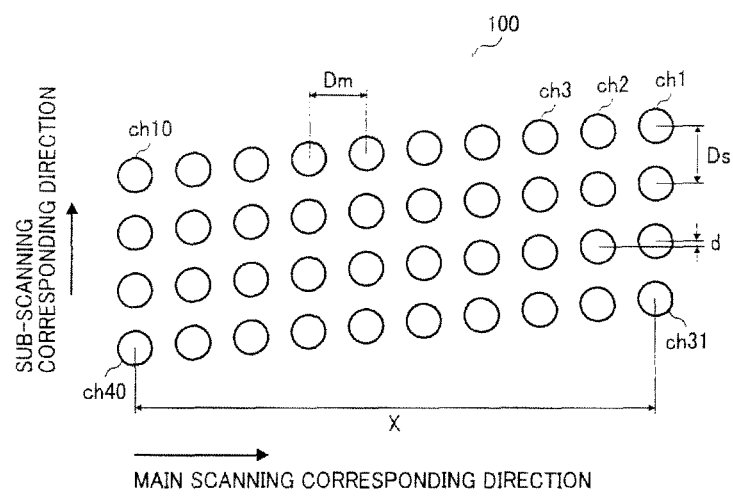
FIG. 18 is a schematic diagram of the configuration of a surface-emitting laser array used in a second embodiment of the present invention.

A second embodiment of the present invention will be described below with reference to FIGS. 18 to 31. The second embodiment is characterized in that each light source includes, instead of the above described LD array, a surface-emitting laser array 100 that has a plurality of light-emitting elements arranged on the same substrate in such a manner as illustrated in FIG. 18 as an example. The other configuration is the same as the configuration of the above-described first embodiment. Therefore, in the following description focus is placed on differences from the first embodiment. Parts corresponding to those in the first embodiment are denoted with the same reference numerals, and the same description is simplified or omitted.

The surface-emitting laser array 100 has two-dimensionally arranged 40 light-emitting elements (ch1 to ch40) formed on a substrate. When all the 40 light-emitting elements are orthographically projected on an imaginary line extending in the sub-scanning corresponding direction, the 40 light-emitting elements are arranged in such manners that the intervals d between the adjacent projected light-emitting elements are equal. Hereinafter, the "interval between light-emitting elements" is the distance between the centers of the two light-emitting elements.

In this example, d=2.5 μm. The interval Dm between the adjacent light-emitting elements is 30 μm in the main-scanning corresponding direction; the interval Ds between the adjacent light-emitting elements is 25 μm in the sub-scanning corresponding direction. The distance X between the farthest light-emitting elements is X=Dm×9=270 μm in the main-scanning corresponding direction; the distance between the farthest light-emitting elements is d×39=97.5 μm in the sub-scanning corresponding direction.

The oscillation wavelength of each light-emitting element is in a 780 nm zone. The luminous flux emitted from each light-emitting element is linearly polarized light.

Figure 19:
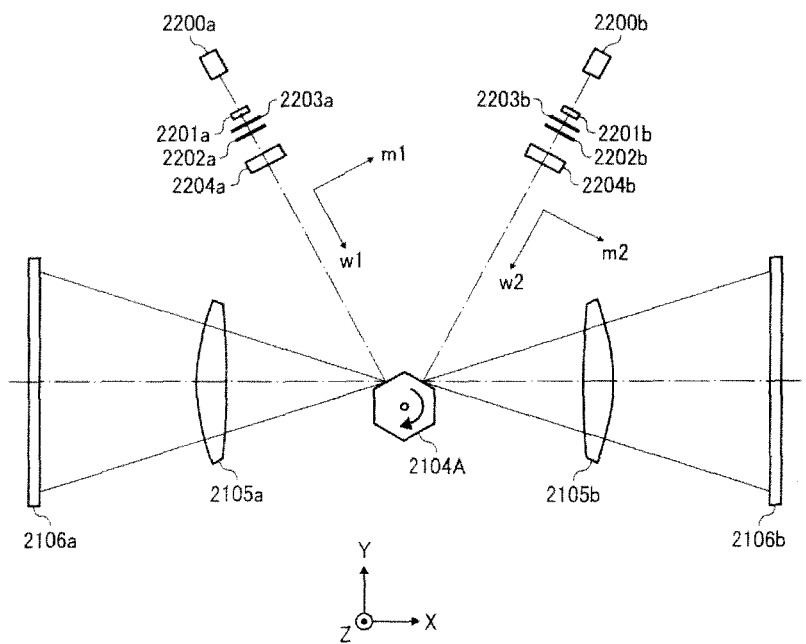
FIG. 19 is a schematic diagram of the configuration of the optical scanner 2010A according to the second embodiment of the present invention.
Figure 20:
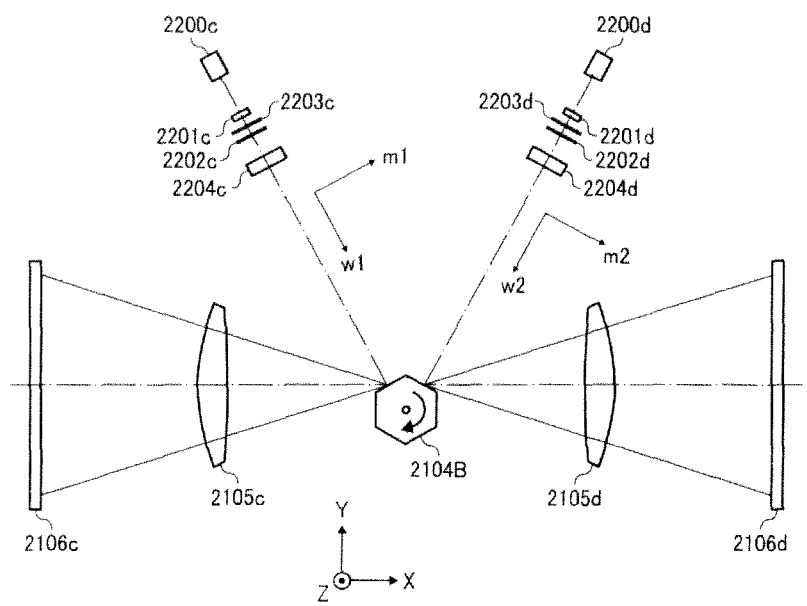
FIG. 20 is a schematic diagram of the configuration of the optical scanner 2010B according to the second embodiment of the present invention.

The surface-emitting laser array has a large variation among the light-emitting elements with respect to the direction of polarization of luminous fluxes emitted. As illustrated in FIGS. 19 and 20, each image station further includes a quarter-wave plate between the coupling lens and the aperture plate. The quarter-wave plate converts linearly polarized light into circularly polarized light, thereby decreasing variation in the direction of polarization between the luminous fluxes that are input to the respective optical scanning systems.

A quarter-wave plate 2203a is disposed on the optical path between the coupling lens 2201a and the aperture plate 2202a and gives a quarter-wave optical phase difference to a luminous flux.

A quarter-wave plate 2203b is disposed on the optical path between the coupling lens 2201b and the aperture plate 2202b and gives a quarter-wave optical phase difference to a luminous flux.

A quarter-wave plate 2203c is disposed on the optical path between the coupling lens 2201c and the aperture plate 2202c and gives a quarter-wave optical phase difference to a luminous flux.

A quarter-wave plate 2203d is disposed on the optical path between the coupling lens 2201d and the aperture plate 2202d and gives a quarter-wave optical phase difference to a luminous flux.

Figure 21:
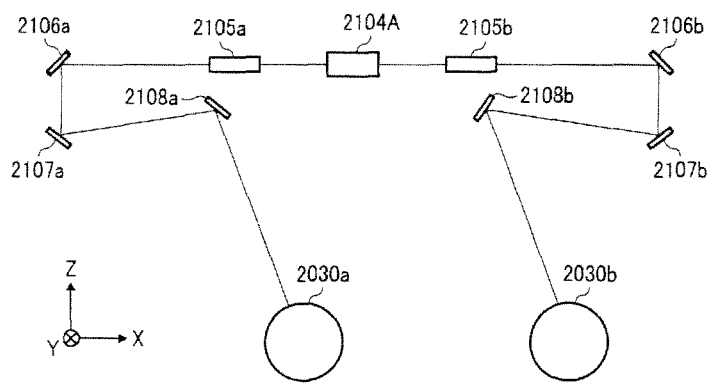
FIG. 21 is a schematic diagram of the configuration of an optical scanning system of the optical scanner 2010A.
Figure 22:
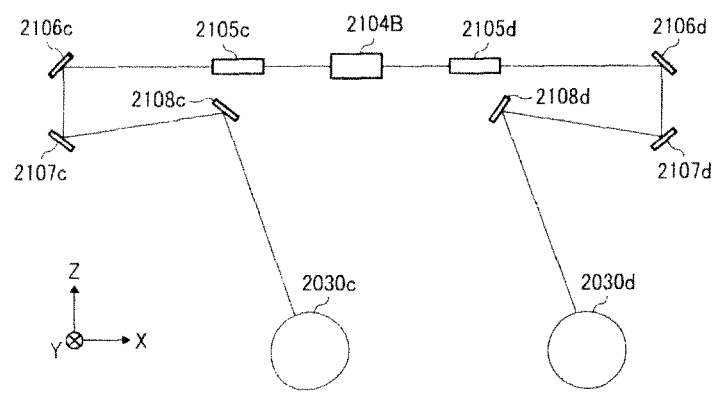
FIG. 22 is a schematic diagram of the configuration of an optical scanning system of the optical scanner 2010B.

FIG. 21 illustrates each optical scanning system of the optical scanner 2010A; FIG. 22 illustrates each optical scanning system of the optical scanner 2010B.

The reflecting mirrors are coated with similar coatings as the reflecting mirrors of the first embodiment.

The angle of inclination of each reflecting mirror will be described below. The optical scanner 2010A will be described below.

Figure 23:
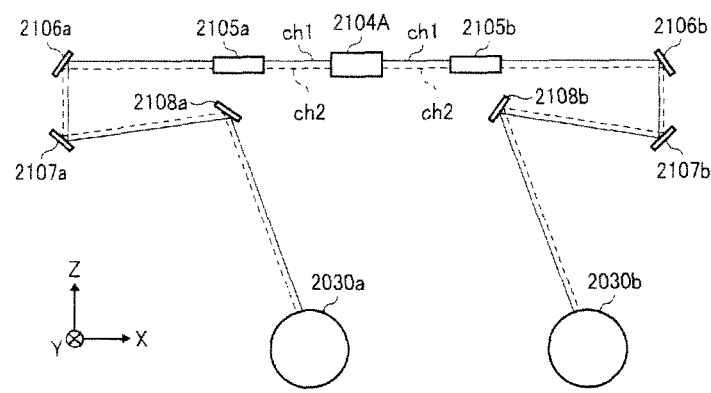
FIG. 23 is a schematic diagram of the optical path of the light beam emitted from ch1 and an optical path of the light beam emitted from ch2 that are represented by the reflecting mirrors.

As illustrated in FIG. 23 for example, among the two light beams deflected by the polygon mirror 2104A: one light beam, on the +Z side is the light beam emitted from ch1 (hereinafter, "light beam ch1") and the other light beam on the −Z side is the light beam emitted from ch2 (hereinafter, "light beam ch2").

Figure 24:
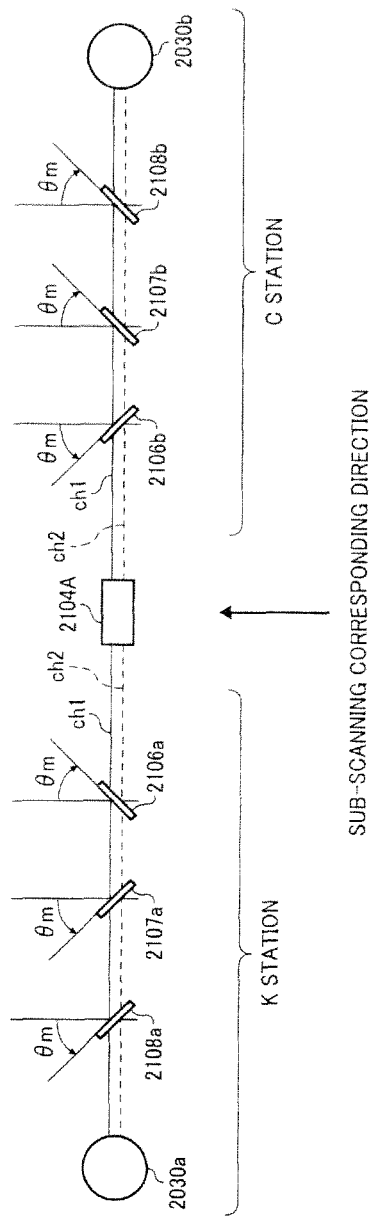
FIG. 24 is a schematic diagram of the optical paths represented as straight horizontal lines so as to illustrate the direction toward which each reflecting mirror is inclined.

FIG. 23 is horizontally developed so that the light beam ch1 is positioned above the light beam ch2 as illustrated in FIG. 24. Angles of inclination θm are illustrated in FIG. 25, where θm is the angle between each reflecting mirror and a direction orthogonal to the optical path of the light beam.

The three reflecting mirrors (2106a, 2107a, and 2108a) of the optical scanning system for the K station will be described below.

Figures 25, 26:
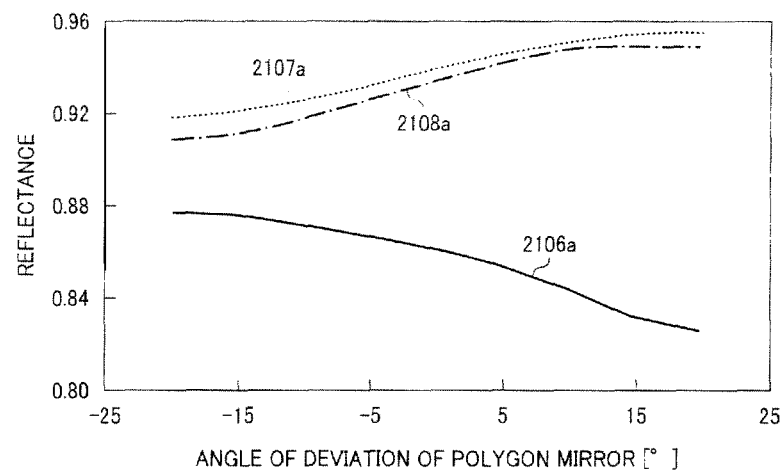
FIG. 25 is a table of the angle of inclination of each reflecting mirror with respect to the light beam.
FIG. 26 is a graph that illustrates the relation, where the luminous flux emitted from the light source is first polarized light, between the reflectance of each reflecting mirror and the angle of deviation of the polygon mirror.

FIG. 26 illustrates the relation, where the luminous flux emitted from the light source is the first polarized light, between the angle of deviation (°) of the luminous flux deflected by the polygon mirror and the reflectances of the deflected luminous flux reflected by the three reflecting mirrors (2106a, 2107a, and 2108a).

Figure 27:
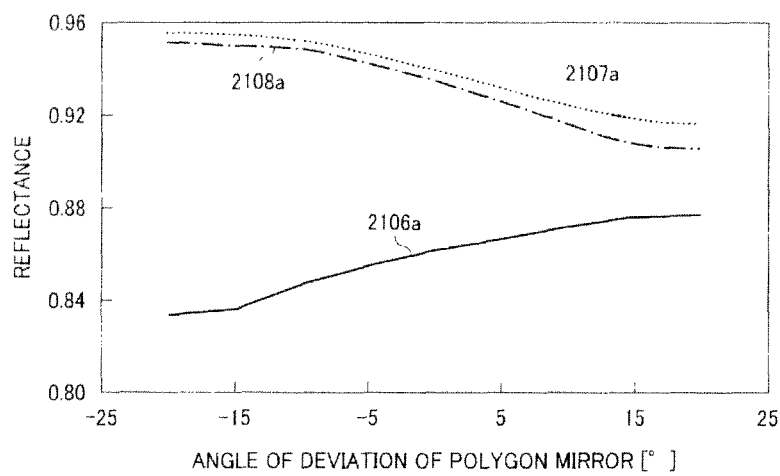
FIG. 27 is a graph that illustrates the relation, where the luminous flux emitted from the light source is second polarized light, between the reflectance of each reflecting mirror and the angle of deviation of the polygon mirror.

FIG. 27 illustrates the relation, where the luminous flux emitted from the light source is the second polarized light, between the angle of deviation (°) of the luminous flux deflected by the polygon mirror and the reflectances of the deflected luminous flux reflected by the three reflecting mirrors (2106a, 2107a, and 2108a).

Figure 28:
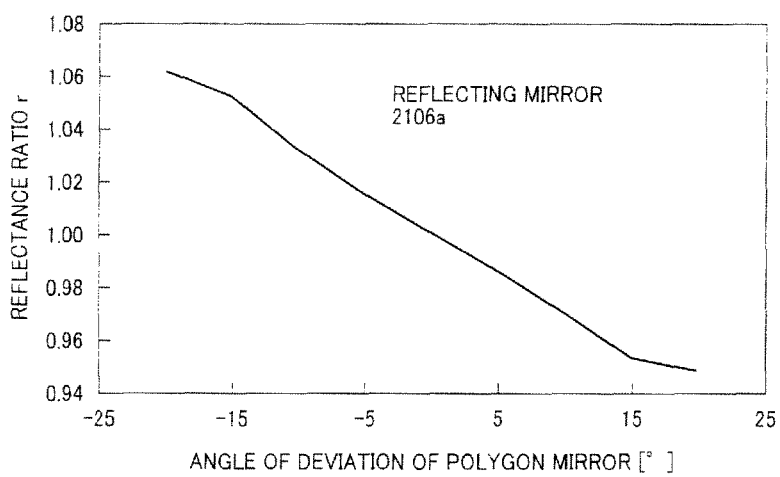
FIG. 28 is a graph that illustrates the relation between the reflectance ratio of the reflecting mirror 2106*a* and the angle of deviation of the polygon mirror.

FIG. 28 illustrates the relation between the reflectance ratio r of the reflecting mirror 2106a and the angle of deviation θp (°) of the polygon mirror.

Figure 29:
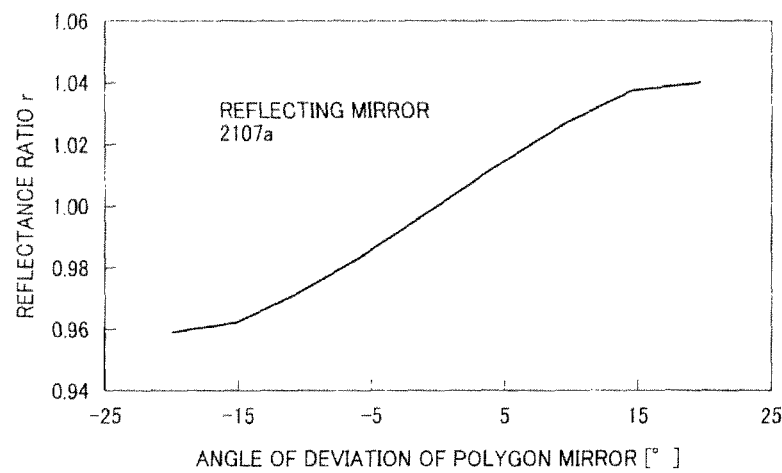
FIG. 29 is a graph that illustrates the relation between the reflectance ratio of the reflecting mirror 2107*a* and the angle of deviation of the polygon mirror.

FIG. 29 illustrates the relation between the reflectance ratio r of the reflecting mirror 2107a and the angle of deviation θp (°) of the polygon mirror.

Figure 30:
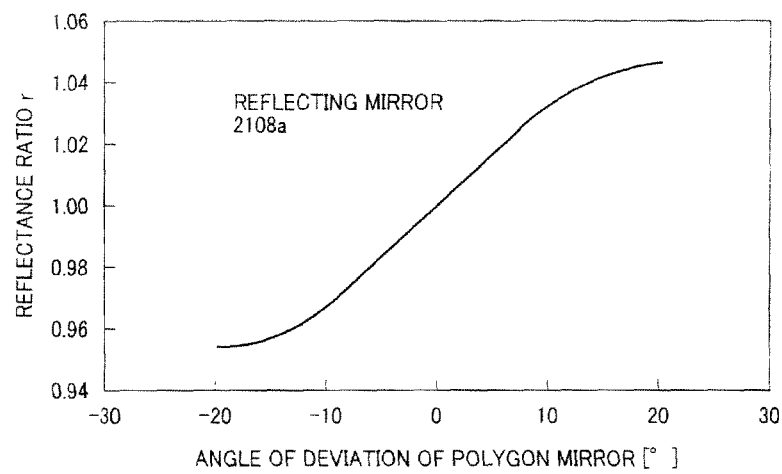
FIG. 30 is a graph that illustrates the relation between the reflectance ratio of the reflecting mirror 2108*a* and the angle of deviation of the polygon mirror.

FIG. 30 illustrates the relation between the reflectance ratio r of the reflecting mirror 2108a and the angle of deviation θp (°) of the polygon mirror.

When the quarter-wave plate is inserted, all lights that are input to the scanning lens become circularly polarized; therefore, when the angle of deviation of the polygon mirror is 0°, the reflectance does not change depending on the direction of polarization of the luminous flux emitted from the light source. Therefore, when the angle of deviation of the polygon mirror is 0° in FIGS. 28 to 30, all the reflectance ratios are 1.00.

However, when the angle of deviation of the polygon mirror is other than 0°, the luminous flux that passes through the scanning lens causes the birefringence by the scanning lens and the luminous flux is converted into elliptically polarized light. The polarized state varies depending on the angle of deviation of the polygon mirror; therefore, even if the quarter-wave plate is inserted, it is impossible to decrease variation in the light use efficiency.

With reference to FIGS. 28 to 30, as for the magnitude relation between r(−20) and r(+20), the reflecting mirror 2106a satisfies r(−20)>r(+20), the reflecting mirror 2107a satisfies r(−20)<r(+20), and the reflecting mirror 2108a satisfies r(−20)<r(+20). In other words, when comparing the three reflecting mirrors (2106a, 2107a, and 2108a) with each other, the reflecting mirror 2106a has the inverse magnitude relation to the magnitude relation of the other reflecting mirrors (2107a and 2108a).

The difference between the maximum value and the minimum value of the reflectance ratio r is 0.114 at the reflecting mirror 2106a; 0.082 at the reflecting mirror 2107a; and 0.093 at the reflecting mirror 2108a. In other words, the reflecting mirror 2106a has the largest difference among the three reflecting mirrors (2106a, 2107a, and 2108a). This is because the reflecting mirror 2106a is coated with a single layer, while the other reflecting mirrors (2107a and 2108a) are not.

Figure 31:
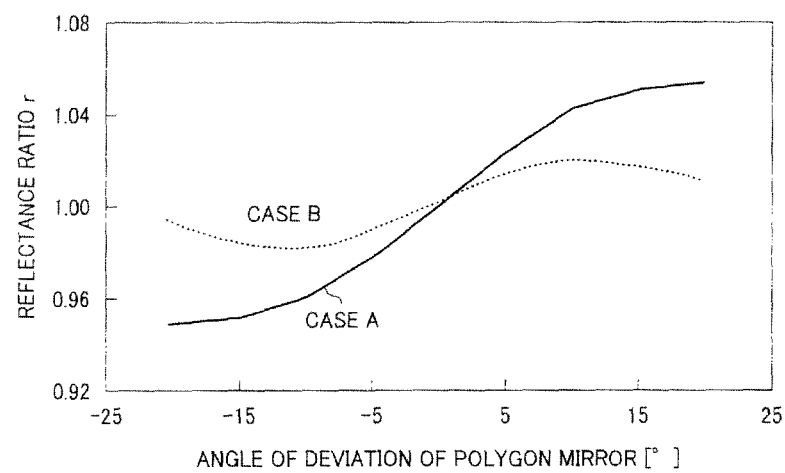
FIG. 31 is a graph that illustrates the relation between the reflectance ratio for each of Case A and Case B and the angle of deviation of the polygon mirror.

FIG. 31 illustrates the relation between the reflectance ratio and the angle of deviation of the polygon mirror, where supposedly all the three reflecting mirrors (2106a, 2107a, and 2108a) are coated with triple layers (Case A) and where the reflecting mirrors 2107a and 2108a are coated with triple layers and the reflecting mirror 2106a is coated with a single layer (Case B).

In Case A, as the angle of deviation of the polygon mirror increases, the reflectance ratio of each of the three reflecting mirrors increases and, therefore, the difference between the reflectance ratios r(−20) and r(+20) is large. In Case B, in contrast, the difference between the reflectance ratios r(−20) and r(+20) may be reduced.

As described above, when the three reflecting mirrors are supposedly coated in the same manner, the light use efficiency varies depending on the image height, which forms the output image having uneven density. In the second embodiment, however, the reflecting mirror 2106a is coated in a different manner so that the deviation of the image-height-based light use efficiency that reflects difference in the polarized state increases; therefore, even when the polarized state of light input to the optical scanning system varies, the deviation of the light use efficiency with respect to the image height may be decreased for the entire optical scanning system.

The three reflecting mirrors (2106a, 2107a, and 2108a) are arranged so that the optical path headed from the polygon mirror 2104A toward the photosensitive drum 2030a does not intersect, when viewed from the Y-axis direction. The reflecting mirror 2106a is disposed in a position closest to the polygon mirror 2104A.

The optical scanning system for the C station has the same configuration. As for the magnitude relation between r(−20) and r(+20) of each of the three reflecting mirrors (2106b, 2107b, and 2108b), the reflecting mirror 2106b has the inverse magnitude relation to the magnitude relation of the other reflecting mirrors (2107b and 2108b).

Moreover, as for the difference between the maximum value and the minimum value of the reflectance ratio r, the reflecting mirror 2106b is set to have the largest difference among the three reflecting mirrors (2106b, 2107b, and 2108b).

Moreover, the three reflecting mirrors (2106b, 2107b, and 2108b) are arranged so that the optical path headed from the polygon mirror 2104A toward the photosensitive drum 2030b does not intersect, when viewed from the Y-axis direction. The reflecting mirror 2106b is disposed closest to the polygon mirror 2104A.

With this configuration, even when the luminous fluxes emitted from a plurality of light-emitting elements have different directions of polarization, the optical scanner 2010A can decrease variation in the intensity of light on the photosensitive drums 2030a and 2030b.

The optical scanner 2010B has the same configuration. In the optical scanning system for the M station, as for the magnitude relation between the reflectance ratio of the luminous flux toward the scanning start position of the photosensitive drum 2030c and the reflectance ratio of the luminous flux toward the scanning end position, the reflecting mirror 2106c is set to have the inverse magnitude relation to the magnitude relation of the other reflecting mirrors (2107c and 2108c).

With respect to the difference between the maximum value and the minimum value of the reflectance ratio in the relationship between the angle of deviation and the reflectance ratio of the polygon mirror 2104B, the reflecting mirror 2106c is set to have the largest difference among the three reflecting mirrors (2106c, 2107c, and 2108c).

Moreover, the three reflecting mirrors (2106c, 2107c, and 2108c) are arranged so that the optical path headed from the polygon mirror 2104B toward the photosensitive drum 2030c does not intersect, when viewed from the Y-axis direction. The reflecting mirror 2106c is disposed in a position closest to the polygon mirror 2104B.

In the optical scanning system for the Y station, as for the magnitude relation between the reflectance ratio of the luminous flux toward the scanning start position of the photosensitive drum 2030d and the reflectance ratio of the luminous flux toward the scanning end position, the reflecting mirror 2106d is set to have the inverse magnitude relation to the magnitude relation of the other reflecting mirrors (2107d and 2108d).

With respect to the difference between the maximum value and the minimum value of the reflectance ratio in the relationship between the angle of deviation and the reflectance ratio at the polygon mirror 2104B, the reflecting mirror 2106d is set to have the largest difference among the three reflecting mirrors (2106d, 2107d, and 2108d).

Moreover, the three reflecting mirrors (2106d, 2107d, and 2108d) are arranged so that the optical path headed from the polygon mirror 2104B toward the photosensitive drum 2030d does not intersect, when viewed from the Y-axis direction. The reflecting mirror 2106d is disposed at a position closest to the polygon mirror 2104B.

With this configuration, even when the luminous fluxes emitted from a plurality of light-emitting elements have different directions of polarization, the optical scanner 2010B can decrease variation in the intensity of light on the photosensitive drums 2030c and 2030d.

Because the MFP used in the second embodiment includes the optical scanners 2010A and 2010B, the MFP may be provided with a lower cost without decreasing the image quality.

Although, in the second embodiment, the surface-emitting laser array 100 has 40 light-emitting elements, the configuration is not limited thereto.

Third Embodiment

Figure 32:
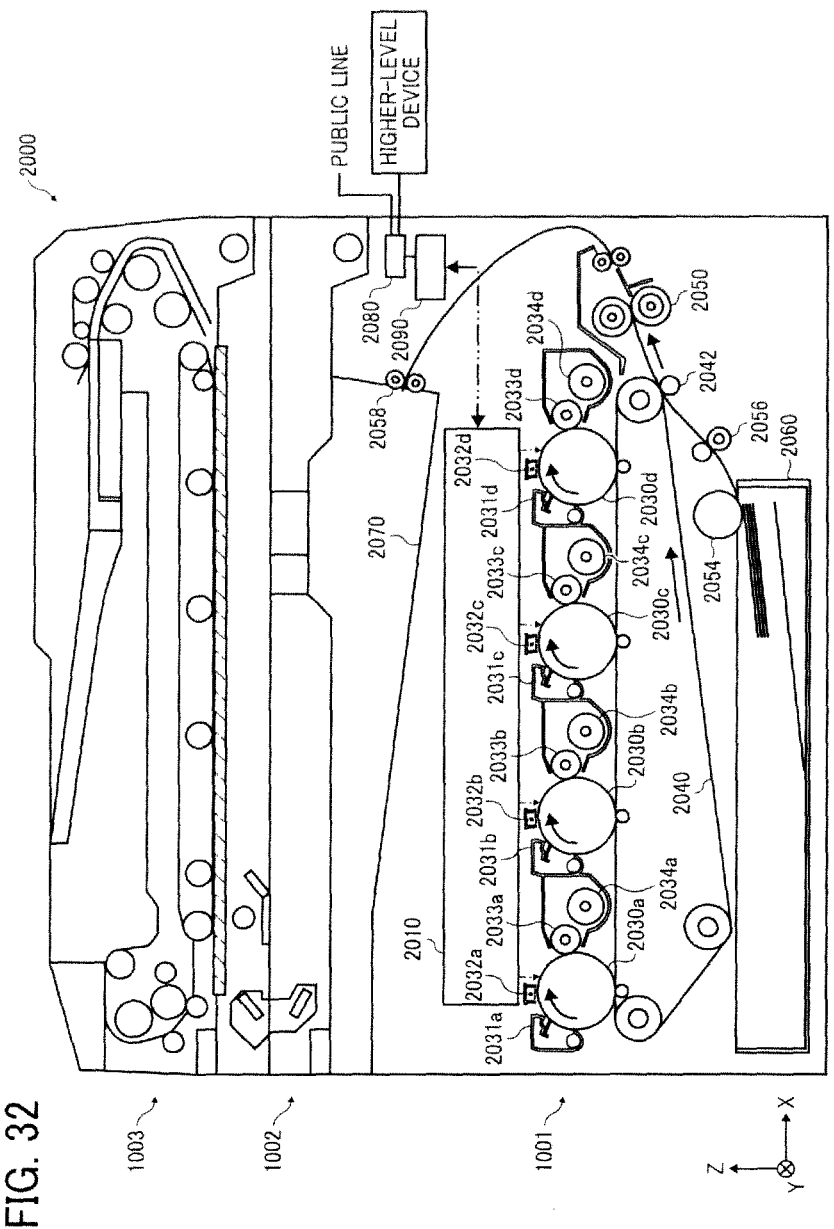
FIG. 32 is a schematic diagram of the configuration of an MFP according to a third embodiment of the present invention.
Figure 33:
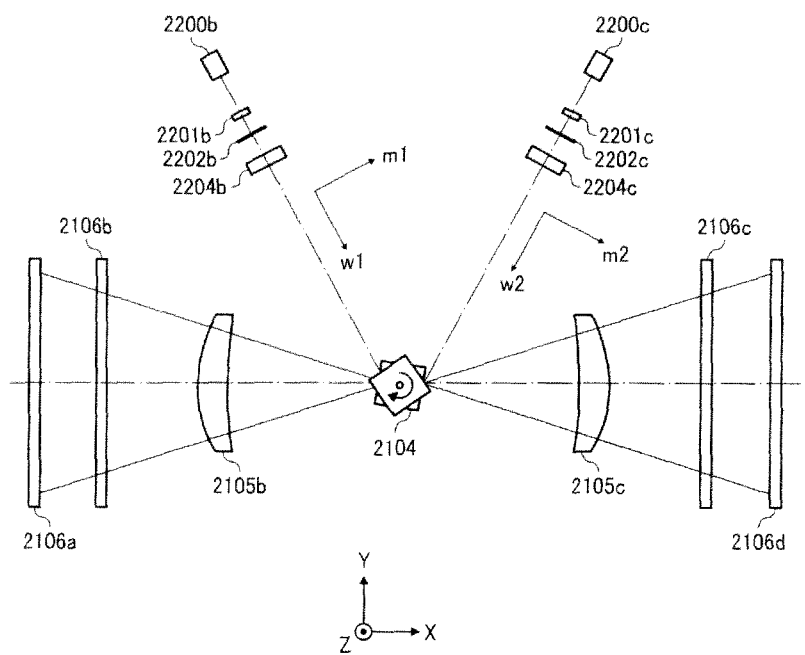
FIG. 33 is a first schematic diagram of the configuration of the optical scanner illustrated in FIG. 32.
Figure 34:
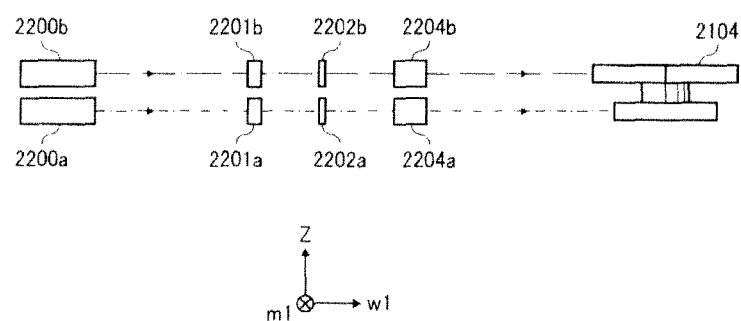
FIG. 34 is a second schematic diagram of the configuration of the optical scanner illustrated in FIG. 32.
Figure 35:
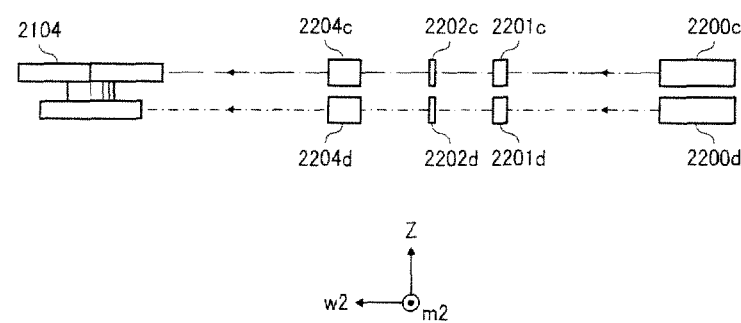
FIG. 35 is a third schematic diagram of the configuration of the optical scanner illustrated in FIG. 32.
Figure 36:
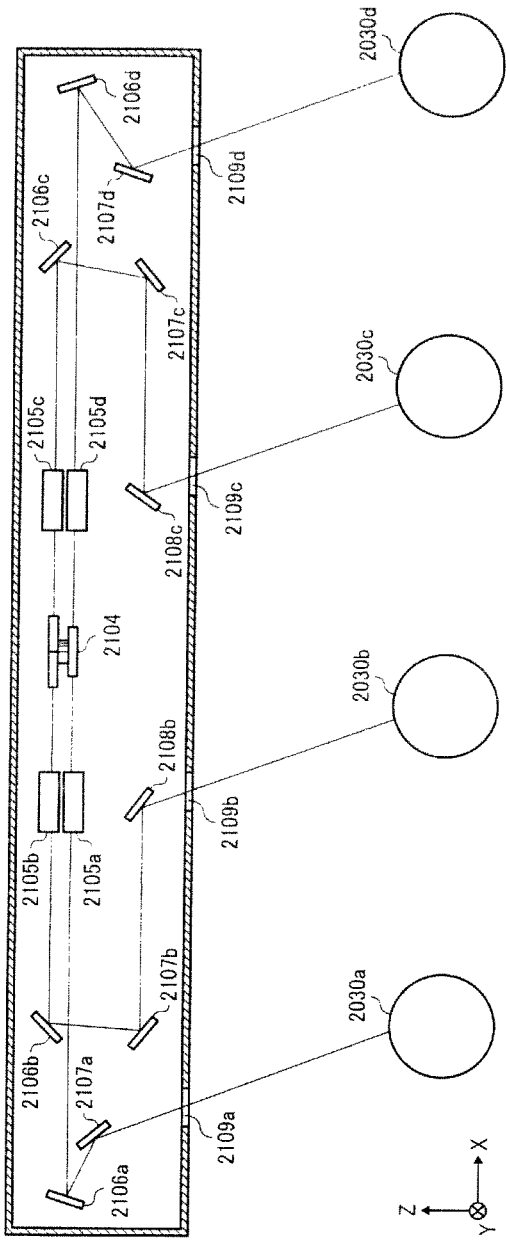
FIG. 36 is a fourth schematic diagram of the configuration of the optical scanner illustrated in FIG. 32.

A third embodiment of the present invention will be described below with reference to FIGS. 32 to 47. FIG. 32 is a schematic diagram of the configuration of an MFP 2000. The MFP 2000 is an image forming apparatus according to the third embodiment. The MFP 2000 is characterized in that it has an optical scanner 2010 instead of the two optical scanners (2010A and 2010B) of the MFP 1000 used in the first embodiment. The other configuration is the same as the configuration of the above-described first embodiment. Therefore, in the following description focus is placed on differences from the first embodiment. Parts corresponding to those in the first embodiment are denoted with the same reference numerals, and the same description is simplified or omitted.

The optical scanner 2010 includes, as illustrated in FIGS. 33 to 36 as an example, the four light sources (2200a, 2200b, 2200c, and 2200d), the four coupling lenses (2201a, 2201b, 2201c, and 2201d), the four aperture plates (2202a, 2202b, 2202c, and 2202d), the four cylindrical lenses (2204a, 2204b, 2204c, and 2204d), a polygon mirror 2104, the four scanning lenses (2105a, 2105b, 2105c, and 2105d), the ten reflecting mirrors (2106a, 2106b, 2106c, 2106d, 2107a, 2107b, 2107c, 2107d, 2108b, and 2108c), four dustproof glasses (2109a, 2109b, 2109c, and 2109d), and a scanning control device (not illustrated), etc. These components are assembled to predetermined positions of an optical-system housing (not illustrated).

Each light source is the LD array same as that used in the first embodiment.

The main-scanning corresponding direction at the light sources 2200a and 2200b is the direction m1; the main-scanning corresponding direction at the light sources 2200c and 2200d is the direction m2. The sub-scanning corresponding direction at the light sources 2200a, 2200b, and the sub-scanning corresponding direction at the light sources 2200c, and 2200d are the same directions as the Z-axis direction.

The light source 2200b and the light source 2200c are disposed apart each other with respect to the X-axis direction. The light source 2200a is disposed on the −Z side of the light source 2200b. The light source 2200d is disposed on the −Z side of the light source 2200c.

The coupling lens 2201a is disposed on the optical path of a luminous flux emitted from the light source 2200a and converts the luminous flux into a substantially parallel luminous flux.

The coupling lens 2201b is disposed on the optical path of a luminous flux emitted from the light source 2200b and converts the luminous flux into a substantially parallel luminous flux.

The coupling lens 2201c is disposed on the optical path of a luminous flux emitted from the light source 2200c and converts the luminous flux into a substantially parallel luminous flux.

The coupling lens 2201d is disposed on the optical path of a luminous flux emitted from the light source 2200d and converts the luminous flux into a substantially parallel luminous flux.

The aperture plate 2202a has an aperture and shapes the luminous flux that has passed through the coupling lens 2201a.

The aperture plate 2202b has an aperture and shapes the luminous flux that has passed through the coupling lens 2201b.

The aperture plate 2202c has an aperture and shapes the luminous flux that has passed through the coupling lens 2201c.

The aperture plate 2202d has an aperture and shapes the luminous flux that has passed through the coupling lens 2201d.

The cylindrical lens 2204a causes the luminous flux that has passed through the aperture of the aperture plate 2202a to form an image near a deflecting/reflecting surface of the polygon mirror 2104 in the Z-axis direction.

The cylindrical lens 2204b causes the luminous flux that has passed through the aperture of the aperture plate 2202b to form an image near the deflecting/reflecting surface of the polygon mirror 2104 in the Z-axis direction.

The cylindrical lens 2204c causes the luminous flux that has passed through the aperture of the aperture plate 2202c to form an image near the deflecting/reflecting surface of the polygon mirror 2104 in the Z-axis direction.

The cylindrical lens 2204d causes the luminous flux that has passed through the aperture of the aperture plate 2202d to form an image near the deflecting/reflecting surface of the polygon mirror 2104 in the Z-axis direction.

The polygon mirror 2104 includes a double-step structured quad mirror, and each mirror has a deflecting/reflecting surface. The first step of the double-step structured quad mirror (lower step), is disposed such that the luminous fluxes coming from the cylindrical lenses 2204a and 2204d are respectively deflected. The second step of the double-step structured quad mirror (upper step) is disposed such that the luminous fluxes coming from the cylindrical lenses 2204b and 2204c are respectively deflected. The quad mirrors of the first step and the second step are rotated with the phases thereof are shifted 45° from each other. The write scanning is performed alternately by the first layer and the second layer.

In this example, the luminous fluxes coming from the cylindrical lenses 2204a and 2204b are deflected toward the −X side of the polygon mirror 2104; the luminous fluxes coming from the cylindrical lenses 2204c and 2204d are deflected toward the +X side of the polygon mirror 2104.

The scanning lenses 2105a and 2105b are disposed on the −X side of the polygon mirror 2104; the scanning lenses 2105c and 2105d are disposed on the +X side of the polygon mirror 2104.

The scanning lens 2105a and the scanning lens 2105b are stacked in the Z-axis direction so that the scanning lens 2105a faces the quad mirrors of the first step and the scanning lens 2105b faces the quad mirrors of the second step. The scanning lens 2105c and the scanning lens 2105d are stacked in the Z-axis direction so that the scanning lens 2105c faces the quad mirrors of the second step and the scanning lens 2105d faces the quad mirrors of the first step.

The optical-system housing has four windows. The luminous flux coming from each optical scanning system passes through the corresponding window and then travels toward the corresponding photosensitive drum. Each window is provided with the above-described dustproof glass. Thickness of each dustproof glass is 1.9 mm and the refractive index of each dustproof glass is 1.530.

The luminous flux coming from the cylindrical lens 2204a, which is deflected by the polygon mirror 2104, travels via the scanning lens 2105a, the two reflecting mirrors (2106a and 2107a), and the dustproof glass 2109a and then illuminates the photosensitive drum 2030a, thereby forming a spot of light. The spot of light moves in the longitudinal direction of the photosensitive drum 2030a in accordance with rotation of the polygon mirror 2104. Namely, the spot of light scans the photosensitive drum 2030a. The moving direction of the spot of light is "the main-scanning direction" at the photosensitive drum 2030a. The rotating direction of the photosensitive drum 2030a is "the sub-scanning direction" at the photosensitive drum 2030a.

The luminous flux coming from the cylindrical lens 2204b, which is deflected by the polygon mirror 2104, travels via the scanning lens 2105b, the three reflecting mirrors (2106b, 2107b, and 2108b), and the dustproof glass 2109b and then illuminates the photosensitive drum 2030b, thereby forming a spot of light. The spot of light moves in the longitudinal direction of the photosensitive drum 2030b in accordance with rotation of the polygon mirror 2104. Namely, the spot of light scans the photosensitive drum 2030b. The moving direction of the spot of light is "the main-scanning direction" at the photosensitive drum 2030b. The rotating direction of the photosensitive drum 2030b is "the sub-scanning direction" at the photosensitive drum 2030b.

The luminous flux coming from the cylindrical lens 2204c, which is deflected by the polygon mirror 2104, travels via the scanning lens 2105c, the three reflecting mirrors (2106c, 2107c, and 2108c), and the dustproof glass 2109c and then illuminates the photosensitive drum 2030c, thereby forming a spot of light. The spot of light moves in the longitudinal direction of the photosensitive drum 2030c in accordance with rotation of the polygon mirror 2104. Namely, the spot of light scans photosensitive drum 2030c. The moving direction of the spot of light is "the main-scanning direction" at the photosensitive drum 2030c. The rotating direction of the photosensitive drum 2030c is "the sub-scanning direction" at the photosensitive drum 2030c.

The luminous flux coming from the cylindrical lens 2204d, which is deflected by the polygon mirror 2104, travels via the scanning lens 2105d, the two reflecting mirrors (2106d and 2107d), and the dustproof glass 2109d and then illuminates the photosensitive drum 2030d, thereby forming a spot of light. The spot of light moves in the longitudinal direction of the photosensitive drum 2030d in accordance with rotation of the polygon mirror 2104. Namely, the spot of light scans the photosensitive drum 2030d. The moving direction of the spot of light is "the main-scanning direction" at the photosensitive drum 2030d. The rotating direction of the photosensitive drum 2030d is "the sub-scanning direction" at the photosensitive drum 2030d.

The optical system disposed on the optical path between the polygon mirror 2104 and each photosensitive drum may be called an "optical scanning system". In the third embodiment, the optical scanning system for the K station includes the scanning lens 2105a, the two reflecting mirrors (2106a and 2107a), and the dustproof glass 2109a. The optical scanning system for the C station includes the scanning lens 2105b, the three reflecting mirrors (2106b, 2107b, and 2108b), and the dustproof glass 2109b.

The optical scanning system for the M station includes the scanning lens 2105c, the three reflecting mirrors (2106c, 2107c, and 2108c), and the dustproof glass 2109c. The optical scanning system for the Y station includes the scanning lens 2105d, the two reflecting mirrors (2106d and 2107d), and the dustproof glass 2109d.

In the optical scanning system for the K station, each of the reflecting mirrors and the dustproof glass 2109a is coated with triple layers of $MgF_2$ (195 nm)+$TiO_2$ (195 nm)+$MgF_2$ (195 nm).

In the optical scanning system for the C station, the reflecting mirror 2106b is coated with a single layer of $MgF_2$ (film thickness 391 nm). The reflecting mirrors 2107b 2108b and the dustproof glass 2109b are coated with triple layers of $MgF_2$ (195 nm)+$TiO_2$ (195 nm)+$MgF_2$ (195 nm).

In the optical scanning system for the M station, the reflecting mirror 2106c is coated with a single layer of $MgF_2$ (film thickness 391 nm). The reflecting mirrors 2107c 2108c and the dustproof glass 2109c are coated with triple layers of $MgF_2$ (195 nm)+$TiO_2$ (195 nm)+$MgF_2$ (195 nm).

In the optical scanning system for the Y station, each of the reflecting mirrors and the dustproof glass 2109d is coated with triple layers of $MgF_2$ (195 nm)+$TiO_2$ (195 nm)+$MgF_2$ (195 nm).

In the coating by the dielectric coating, as the number of dielectric coating layers increases, the reflectance increases and a change in the reflectance that depends on the angle of incidence decreases. The dustproof glass may be coated with a material that is different from a material for coating the reflecting mirror.

The angle of inclination of each of the reflecting mirrors and the dustproof glasses will be described below.

Figure 37:
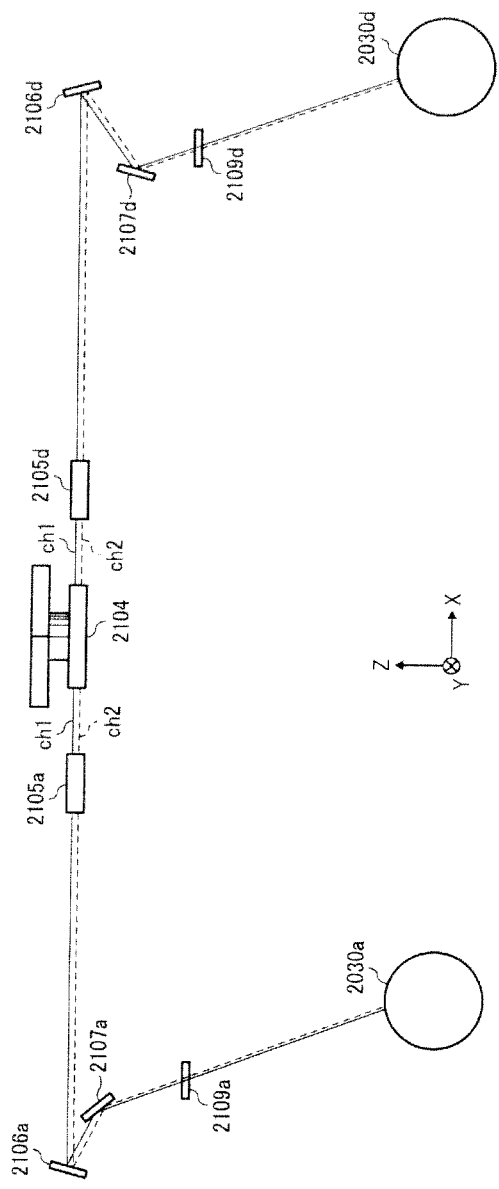
FIG. 37 is a first schematic diagram of an optical path of a light beam emitted from ch1 and an optical path of a light beam emitted from ch2 that are reflected by the reflecting mirrors and the dustproof glasses.
Figure 38:
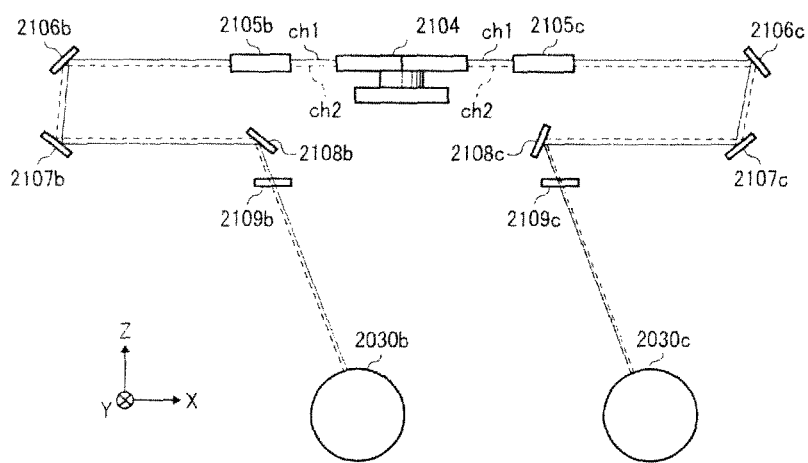
FIG. 38 is a second schematic diagram of an optical path of a light beam emitted from ch1 and an optical path of a light beam emitted from ch2 that are reflected by the reflecting mirrors and the dustproof glasses.

As illustrated in FIGS. 37 and 38 as an example, out of the two light beams that are deflected by the polygon mirror 2104: one light beam on the +Z side is the light beam emitted from ch1 (hereinafter, "light beam ch1") and the other light beam on the −Z side is the light beam emitted from ch2 (hereinafter, "light beam ch2").

Figure 39:
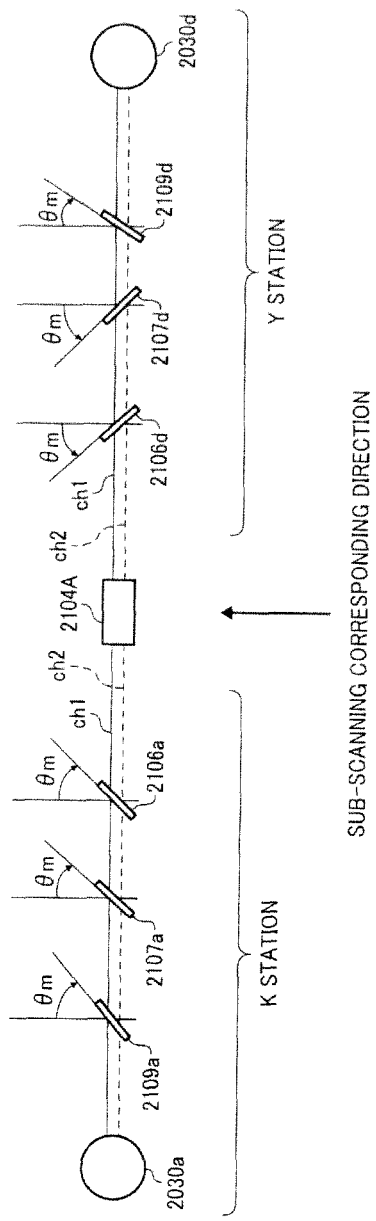
FIG. 39 is a schematic diagram of the optical paths illustrated in FIG. 37 represented as straight horizontal lines so as to illustrate a direction toward which each of the reflecting mirrors and the dustproof glasses is inclined.
Figure 40:
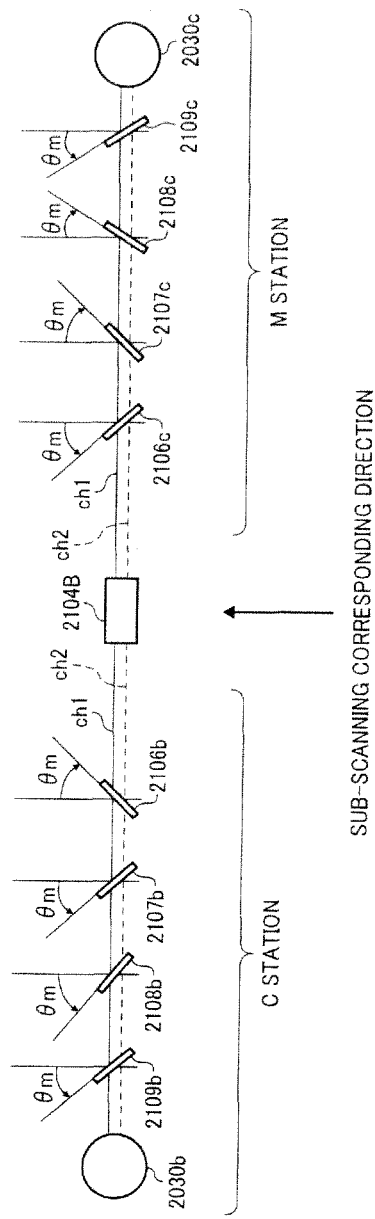
FIG. 40 is a schematic diagram of the optical paths illustrated in FIG. 38 represented as straight horizontal lines so as to illustrate a direction toward which each of the reflecting mirrors and the dustproof glasses is inclined.
Figures 41, 42:
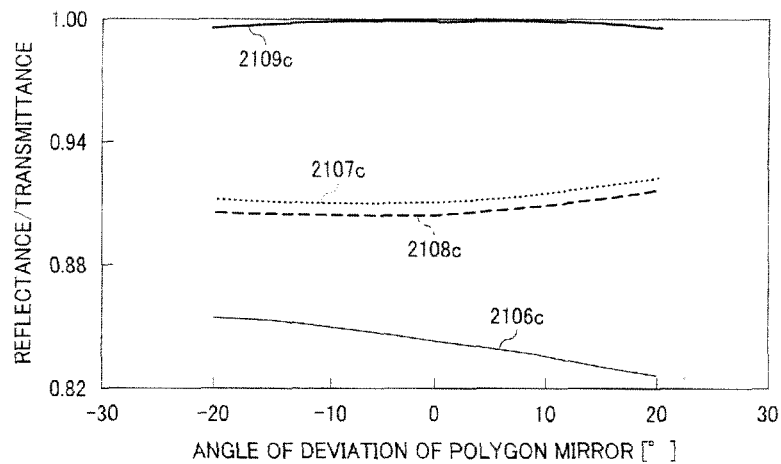
FIG. 41 is a table of the angle of inclination of each of the reflecting mirrors and the dustproof glasses with respect to the light beam.
FIG. 42 is a graph that illustrates, where the luminous flux emitted from the light source is first polarized light, the relation between the reflectance of each reflecting mirror and the angle of deviation of the polygon mirror and the relation between the transmittance of the dustproof glass and the angle of deviation of the polygon mirror.

FIG. 37 is horizontally developed so that the optical path of the light beam ch1 is positioned above the optical path of the light beam ch2 as illustrated in FIG. 39. FIG. 38 is horizontally developed so that the optical path of the light beam ch1 is positioned above the optical path of the light beam ch2 as illustrated in FIG. 40. Angles of inclination θm are illustrated in FIG. 41, where θm is the angle between each reflecting mirror and a direction orthogonal to the optical path of the light beam. When the reflecting mirrors and the dustproof glasses are inclined toward the polygon mirror, θm is positive. When the reflecting mirrors and the dustproof glasses are inclined toward the photosensitive drum, θm is negative.

The three reflecting mirrors (2106c, 2107c, and 2108c) of the optical scanning system for the M station will be described below.

When the luminous flux emitted from the light source is the first polarized light, FIG. 42 illustrates the relation among the angle of deviation (°) of the luminous flux deflected by the polygon mirror and the reflectances of the deflected luminous flux reflected by the three reflecting mirrors (2106c, 2107c, and 2108c) and the transmittance of the dustproof glass 2109c.

Figure 43:
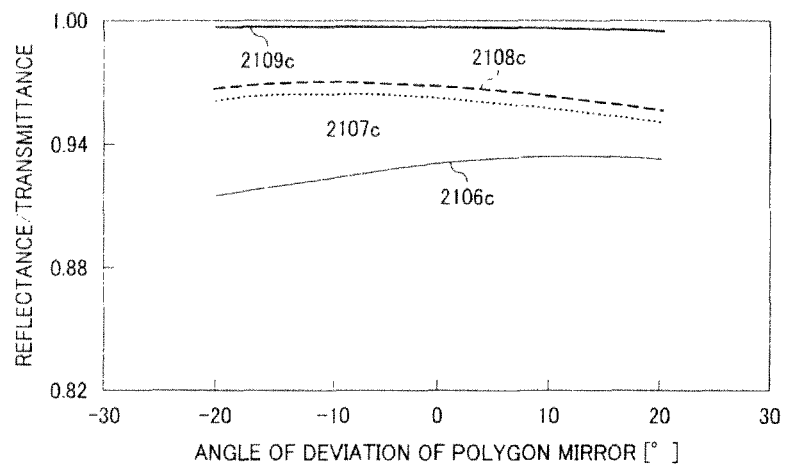
FIG. 43 is a graph that illustrates, where the luminous flux emitted from the light source is second polarized light, the relation between the reflectance of each reflecting mirror and the angle of deviation of the polygon mirror and the relation between the transmittance of the dustproof glass and the angle of deviation of the polygon mirror.

When the luminous flux emitted from the light source is the second polarized light, FIG. 43 illustrates the relation between the angle of deviation) (°) of the luminous flux deflected by the polygon mirror and the reflectances of the deflected luminous flux reflected by the three reflecting mirrors (2106c, 2107c, and 2108c) and the transmittance of the dustproof glass 2109c.

In the dustproof glass, "the transmittance when the luminous flux emitted from the light source is the second polarized light" divided by "the transmittance when the luminous flux emitted from the light source is the first polarized light" is called "transmittance ratio".

Figure 44:
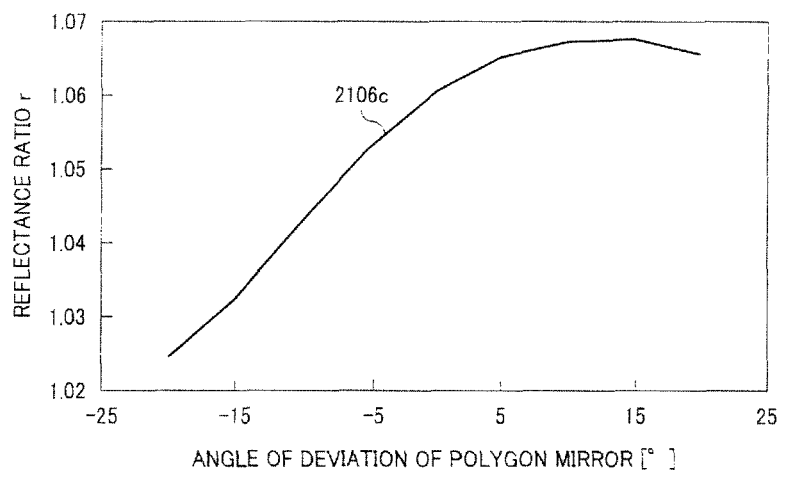
FIG. 44 is a graph that illustrates the relation between the reflectance ratio of the reflecting mirror 2106*c* and the angle of deviation of the polygon mirror.

FIG. 44 illustrates the relation between the reflectance ratio r of the reflecting mirror 2106c and the angle of deviation θp (°) of the polygon mirror.

Figure 45:
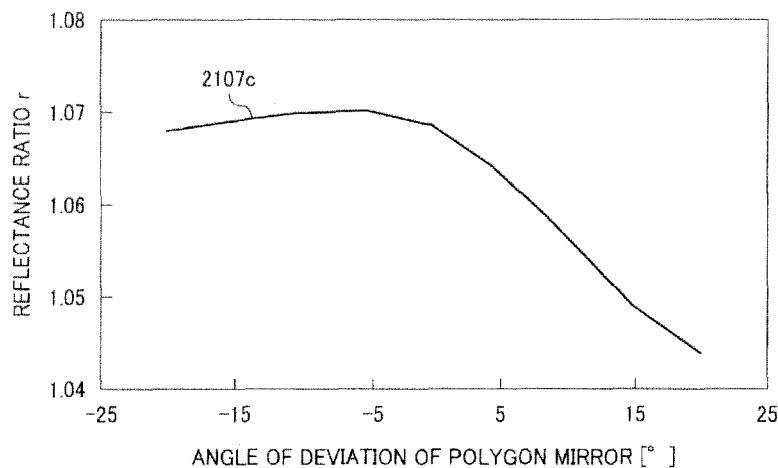
FIG. 45 is a graph that illustrates the relation between the reflectance ratio of the reflecting mirror 2107*c* and the angle of deviation of the polygon mirror.

FIG. 45 illustrates the relation between the reflectance ratio r of the reflecting mirror 2107c and the angle of deviation θp (°) of the polygon mirror.

Figure 46:
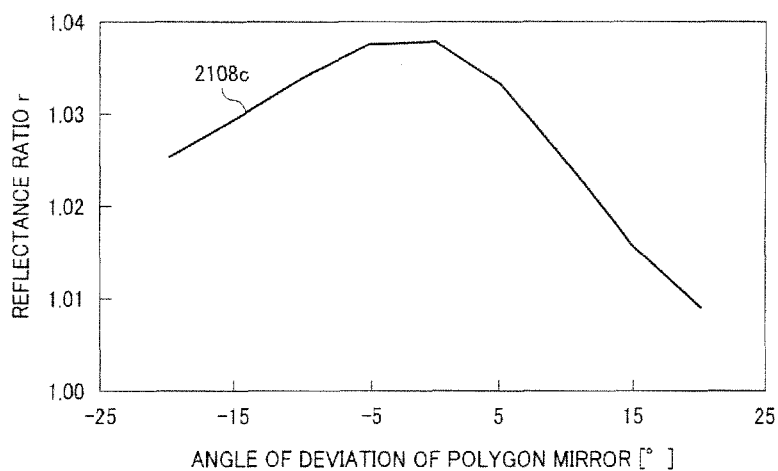
FIG. 46 is a graph that illustrates the relation between the reflectance ratio of the reflecting mirror 2108*c* and the angle of deviation of the polygon mirror.

FIG. 46 illustrates the relation between the reflectance ratio r of the reflecting mirror 2108c and the angle of deviation θp (°) of the polygon mirror.

Figure 47:
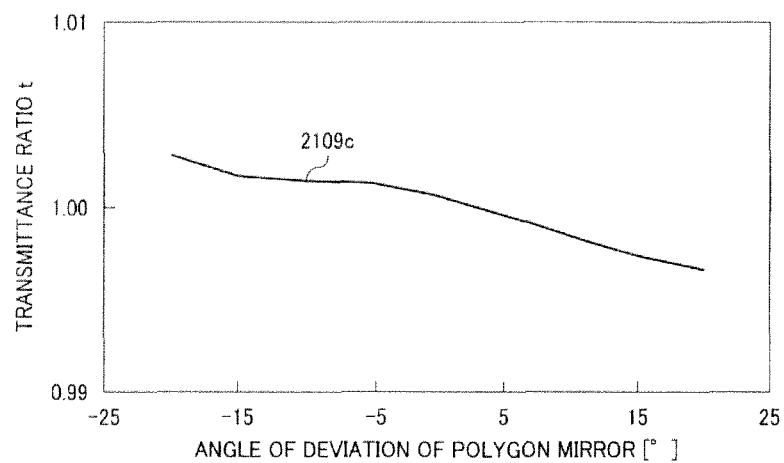
FIG. 47 is a graph that illustrates the relation between the transmittance ratio of the dustproof glass 2109*c* and the angle of deviation of the polygon mirror.

FIG. 47 illustrates the relation between the transmittance ratio t of the dustproof glass 2109c and the angle of deviation θp (°) of the polygon mirror.

The luminous flux whose angle of deviation at the polygon mirror θp is −20° is the luminous flux that travels toward the scanning start position of the photosensitive drum. The transmittance ratio of this luminous flux is denoted as t(−20). The luminous flux whose angle of deviation θp is +20° is the luminous flux that travels toward the scanning end position of the photosensitive drum. The transmittance ratio of this luminous flux is denoted as t(+20).

With reference to FIGS. 44 to 47, as for the magnitude relation between r(−20) and r(+20) and the magnitude relation between t(−20) and t(+20), the reflecting mirror 2106c satisfies r(−20)<r(+20), the reflecting mirror 2107c satisfies r(−20)>r(+20), the reflecting mirror 2108c satisfies r(−20)>r(+20), and the dustproof glass 2109c satisfies t(−20)>t(+20). In other words, when comparing the three reflecting mirrors (2106c, 2107c, and 2108c) and the dustproof glass 2109c, the reflecting mirror 2106c has the inverse magnitude relation to the magnitude relation of the other reflecting mirrors (2107c and 2108c) and the dustproof glass 2109c.

The difference between the maximum value and the minimum value of the reflectance ratio r are 0.057 at the reflecting mirror 2106c, 0.028 at the reflecting mirror 2107c, and 0.027 at the reflecting mirror 2108c. The difference between the maximum value and the minimum value of the transmittance ratio t is 0.003 at the dustproof glass 2109c. Namely, the reflecting mirror 2106c has the largest difference among the three reflecting mirrors (2106c, 2107c, and 2108c) and the dustproof glass 2109c. This is because the reflecting mirror 2106c is coated with a single layer, while the other reflecting mirrors (2107c and 2108c) and the dustproof glass 2109c are not.

The light use efficiency of the optical scanning system may be expressed by the product of the reflectances of the three reflecting mirrors and the transmittance of the dustproof glass.

If the three reflecting mirrors and the dustproof glass are coated in the same manner, the light use efficiency varies depending on the image height, which forms the output image having uneven density. In the third embodiment, however, the reflecting mirror 2106c is exclusively coated in such a manner that the deviation of the image-height-based light use efficiency due to difference in the polarized state increases; therefore, even when the polarized state of light input to the optical scanning system varies, the deviation of the light use efficiency with respect to the image height decreases for the entire optical scanning system.

In the same manner as the optical scanning system for the M station, the optical scanning system for the C station that includes the three reflecting mirrors (2106b, 2107b, and 2108b) and the dustproof glass 2109b, the angle of inclination of the dustproof glass 2109b is inverse to the angle of inclination of the dustproof glass 2109c included in the M station. Therefore, even if the optical scanning system for the C station has the reflecting mirror 2106b coated in the same manner as the other reflecting mirrors, the effects of the variation in the light use efficiency at the reflecting mirror 2106b with respect to the polarized state of the luminous flux emitted from the light source is the same as the effects of the variation in the light use efficiency at the dustproof glass 2109b; therefore, the variation in the light use efficiency with respect to the polarized state of the luminous flux emitted from the light source is smaller than the variation that occurs due to the optical scanning system for the M station. It is, of course, allowable to coat the reflecting mirror 2106b in a different manner so as to reduce the effects.

Both the optical scanning system for the K station and the optical scanning system for the Y station include two reflecting mirrors, as illustrated in FIG. 41, arranged in such a manner that the direction of inclination of the two reflecting mirror are the same; therefore, even if the two reflecting mirrors are coated in different manners as the three reflecting mirrors are coated in different manners, it is impossible to cancel out the deviation of the light use efficiency with respect to the polarized state of the luminous flux emitted from the light source.

Moreover, as is clear from FIG. 47, the dustproof glass is not sufficient to cancel out the deviation of the light use efficiency with respect to the polarized state emitted from the light source. Moreover, if the number of coating layers of the dustproof glass decreases, ghost light occurs; therefore, this solution is not preferable.

Therefore, in both the optical scanning system for the K station and the optical scanning system for the Y station, each of the reflecting mirrors and the dustproof glass is coated with the triple layers of $MgF_2+TiO+MgF_2$. With this configuration, each optical element reduces the deviation of the light use efficiency.

As described above, the optical scanner 2010 according to the third embodiment includes the light sources (2200a, 2200b, 2200c, and 2200d) each having an LD array that includes two light-emitting elements; the polygon mirror 2104 that deflects a luminous flux coming from each light source; the optical scanning system for the K station that collects, on the surface of the photosensitive drum 2030a, the luminous flux that is emitted from the light source 2200a and then deflected by the polygon mirror 2104; the optical scanning system for the C station that collects, on the surface of the photosensitive drum 2030b, the luminous flux that is emitted from the light source 2200b and then deflected by the polygon mirror 2104; the optical scanning system for the M station that collects, on the surface of the photosensitive drum 2030c, the luminous flux that is emitted from the light source

2200*c* and then deflected by the polygon mirror 2104; and the optical scanning system for the Y station that collects, on the surface of the photosensitive drum 2030*d*, the luminous flux that is emitted from the light source 2200*d* and then deflected by the polygon mirror 2104.

Each of the optical scanning system for the C station and the optical scanning system for the M station includes the three reflecting mirrors and the dustproof glass.

In each of the optical scanning system for the C station and the optical scanning system for the M station, as for the reflectance ratio with reference to the angle of deviation of the polygon mirror 2104 and the transmittance ratio with reference to the angle of deviation of the polygon mirror 2104, when the magnitude relation is analyzed between the reflectance ratio or the transmittance ratio of the luminous flux toward the scanning start position of the photosensitive drum and the reflectance ratio or the transmittance ratio of the luminous flux toward the scanning end position, one reflecting mirror that is selected from the three reflecting mirrors has the inverse magnitude relation to the magnitude relation of the other reflecting mirrors and the dustproof glass. Moreover, it is set that the difference between the maximum value and the minimum value of the reflectance ratio for the selected reflecting mirror has a larger difference than the differences of the unselected reflecting mirrors and the transmittance ratio between the maximum value and the minimum value of the dustproof glass.

With this configuration, variation is decreased in the intensity of light on the photosensitive drums 2030*b* and 2030*c*.

Because the MFP 2000 used in the third embodiment includes the optical scanner 2010, the MFP 2000 may be provided with a lower cost without decreasing the image quality.

Fourth Embodiment

A fourth embodiment of the present invention will be described below with reference to FIGS. 48 to 59. The fourth embodiment is characterized in that each light source used in the third embodiment includes, instead of the LD array, a plurality of surface-emitting laser array 100 arranged on the same substrate in the same manner as in the light source used in the second embodiment. The other configuration is the same as the configuration of the above-described third embodiment. The difference from the third embodiment will mainly be described below. Parts corresponding to those in the third embodiment are denoted with the same reference numerals, and the same description is simplified or omitted.

Figure 48:
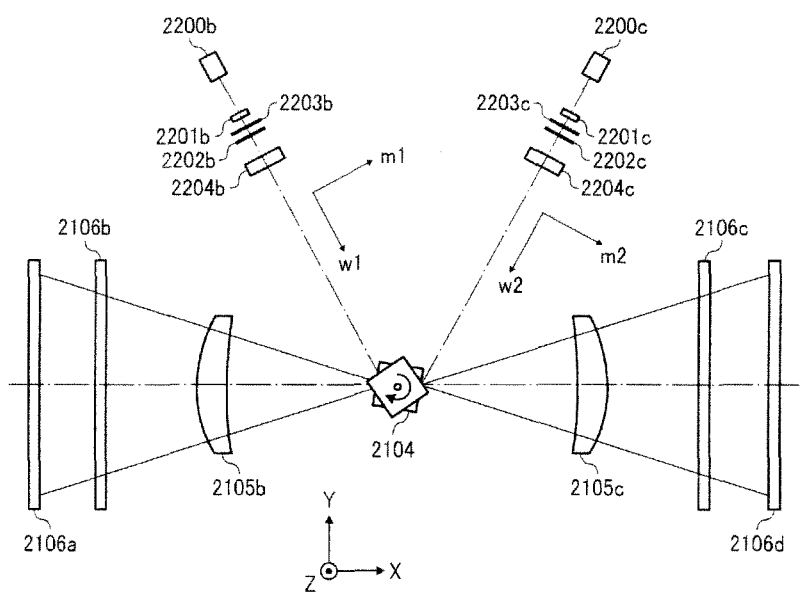
FIG. 48 is a first schematic diagram of the configuration of an optical scanner according to a fourth embodiment of the present invention.
Figure 49:
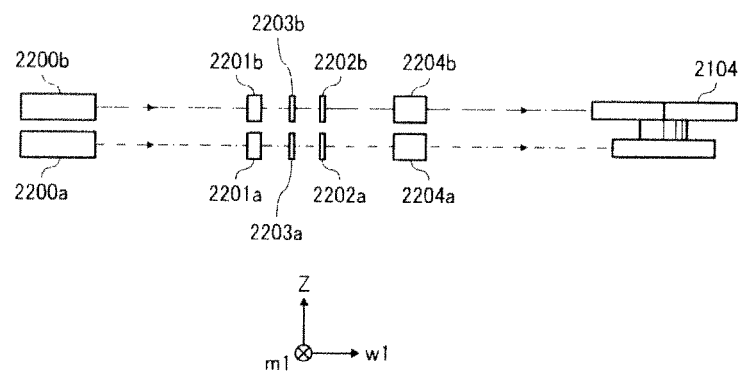
FIG. 49 is a second schematic diagram of the configuration of the optical scanner according to the fourth embodiment of the present invention.
Figure 50:
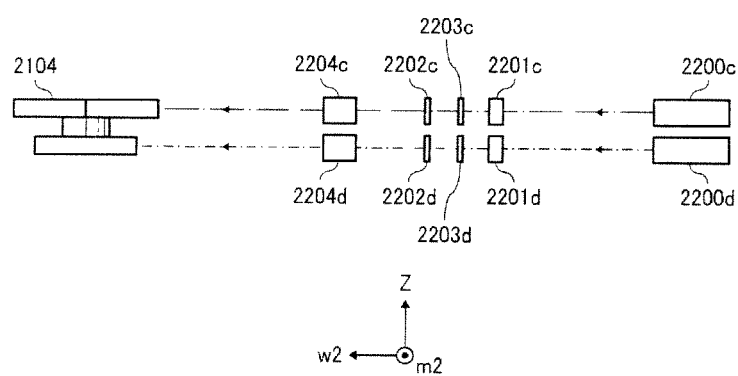
FIG. 50 is a third schematic diagram of the configuration of the optical scanner according to the fourth embodiment of the present invention.

The surface-emitting laser array has a large variation among the light-emitting elements with respect to the direction of polarization of luminous fluxes emitted. In the fourth embodiment, as illustrated in FIGS. 48 to 50, each image station further includes a quarter-wave plate between the coupling lens and the aperture plate. The quarter-wave plate converts linearly polarized light into circularly polarized light, thereby decreasing the variation in the direction of polarization of the luminous fluxes that are input to the respective optical scanning systems.

The quarter-wave plate 2203*a* is disposed on the optical path between the coupling lens 2201*a* and the aperture plate 2202*a* and gives a quarter-wave optical phase difference to a luminous flux.

The quarter-wave plate 2203*b* is disposed on the optical path between the coupling lens 2201*b* and the aperture plate 2202*b* and gives a quarter-wave optical phase difference to a luminous flux.

The quarter-wave plate 2203*c* is disposed on the optical path between the coupling lens 2201*c* and the aperture plate 2202*c* and gives a quarter-wave optical phase difference to a luminous flux.

The quarter-wave plate 2203*d* is disposed on the optical path between the coupling lens 2201*d* and the aperture plate 2202*d* and gives a quarter-wave optical phase difference to a luminous flux.

Figure 51:
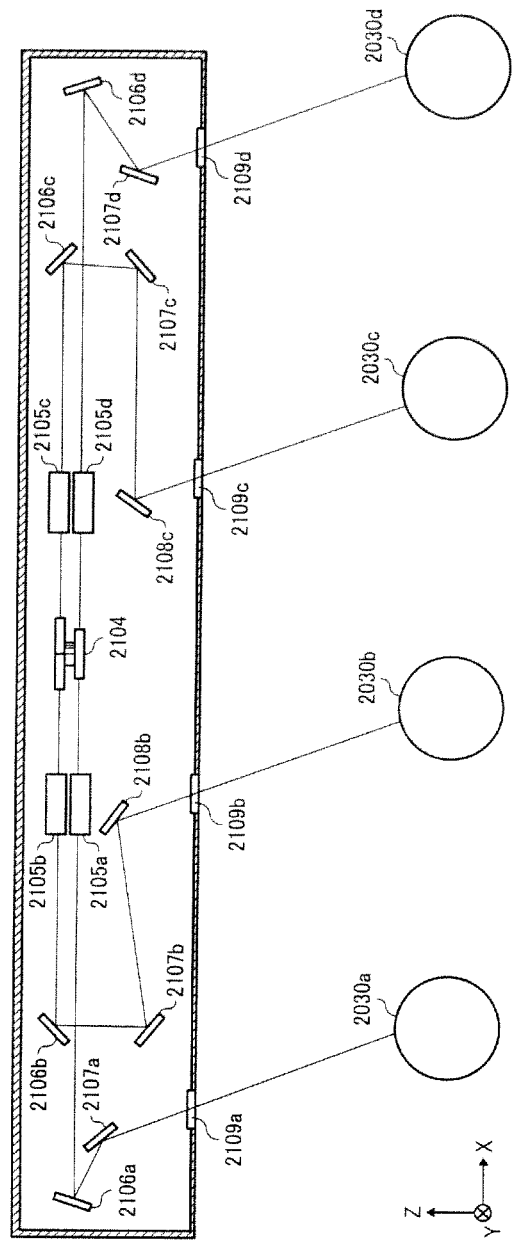
FIG. 51 is a fourth schematic diagram of the configuration of the optical scanner according to the fourth embodiment of the present invention.

FIG. 51 illustrates each optical scanning system.

Each of the reflecting mirrors and the dustproof glasses is coated in the same manner in the third embodiment.

The angle of inclination of each of the reflecting mirrors and the dustproof glasses will be described below.

Figure 52:
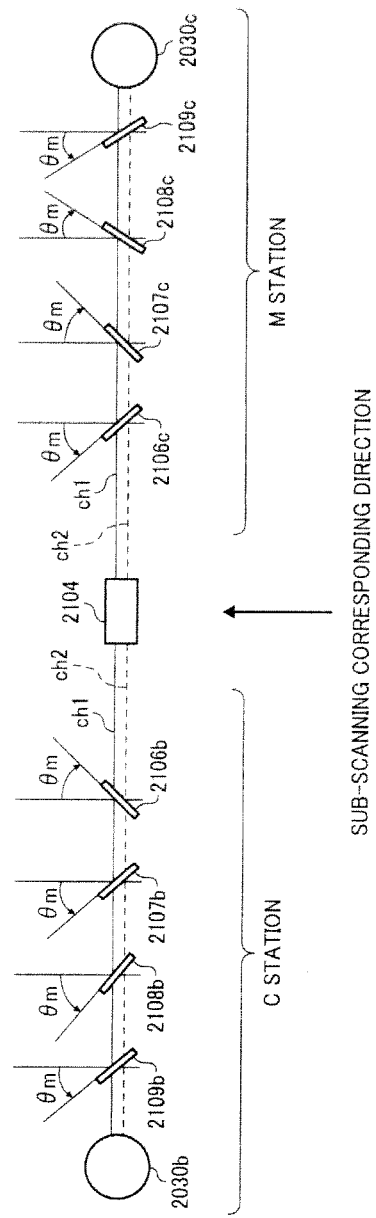
FIG. 52 is a schematic diagram of the optical paths represented as straight horizontal lines so as to illustrate the direction toward which each of the reflecting mirrors and the dustproof glasses is inclined.

The optical paths of the light beams ch1 and ch2 are horizontally developed so that the light beam ch1 is positioned above the light beam ch2 as illustrated in FIG. 52. Angles of inclination θm are illustrated in FIG. 53, where θm is the angle between each of the reflecting mirrors and the dustproof glasses included in the optical scanning systems for the C station and the M station and a direction orthogonal to the optical path of the luminous flux.

The relation between the reflectance ratio and the transmittance ratio and the angle of deviation of the polygon mirror will be described below.

The optical scanning system for the M station is described below.

Figures 53, 54:
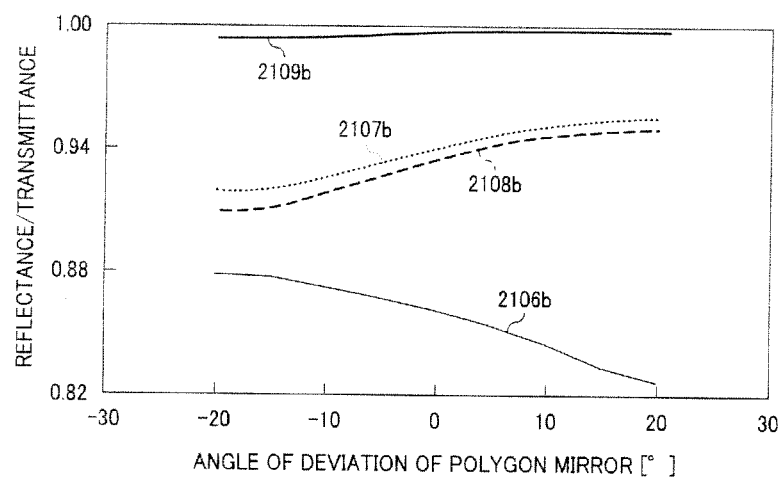
FIG. 53 is a table of the angle of inclination of each of the reflecting mirrors and the dustproof glasses with respect to the light beam.
FIG. 54 is a graph that illustrates, where the luminous flux emitted from the light source is first polarized light, the relation between the reflectance of each reflecting mirror and the angle of deviation of the polygon mirror and the relation between the transmittance of the dustproof glass and the angle of deviation of the polygon mirror.

FIG. 54 illustrates the relation, where the luminous flux emitted from the light source is the first polarized light, between the angle of deviation (°) of the luminous flux deflected by the polygon mirror and the reflectances of the deflected luminous flux reflected by the three reflecting mirrors (2106*c*, 2107*c*, and 2108*c*) and the transmittance of the dustproof glass 2109*c*.

Figure 55:
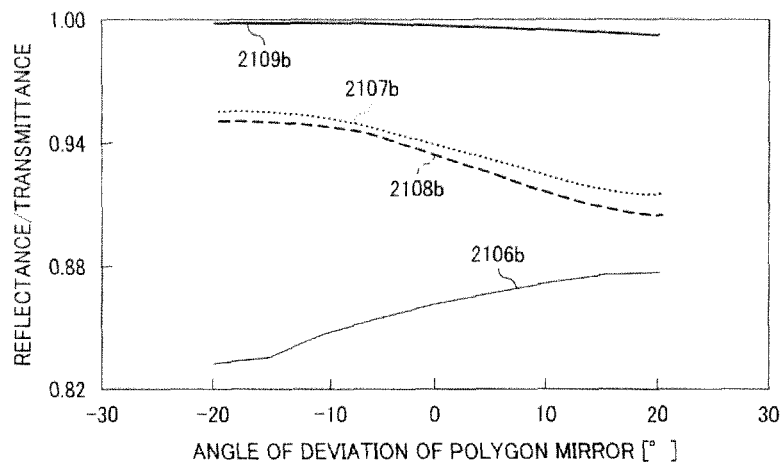
FIG. 55 is a graph that illustrates, where the luminous flux emitted from the light source is second polarized light, the relation between the reflectance of each reflecting mirror and the angle of deviation of the polygon mirror and the relation between the transmittance of the dustproof glass and the angle of deviation of the polygon mirror.

FIG. 55 illustrates the relation, where the luminous flux emitted from the light source is the second polarized light, between the angle of deviation (°) of the luminous flux deflected by the polygon mirror and the reflectances of the deflected luminous flux reflected by the three reflecting mirrors (2106*c*, 2107*c*, and 2108*c*) and the transmittance of the dustproof glass 2109*c*.

Figure 56:
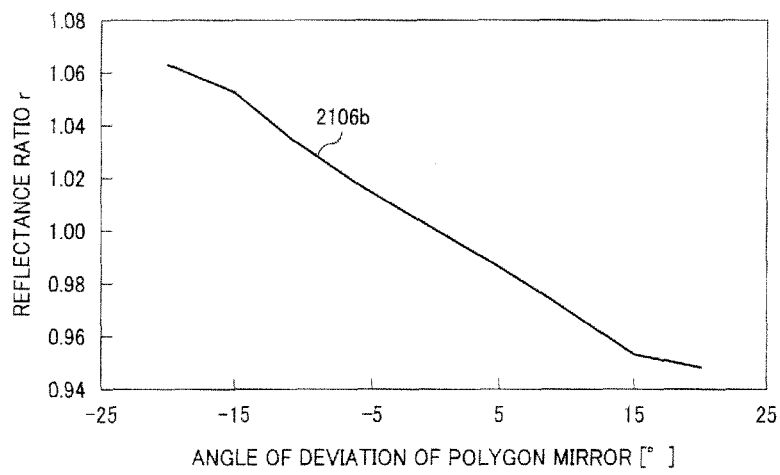
FIG. 56 is a graph that illustrates the relation between the reflectance ratio of the reflecting mirror 2106*b* and the angle of deviation of the polygon mirror.

FIG. 56 illustrates the relation between the reflectance ratio r of the reflecting mirror 2106*c* and the angle of deviation θp (°) of the polygon mirror.

Figure 57:
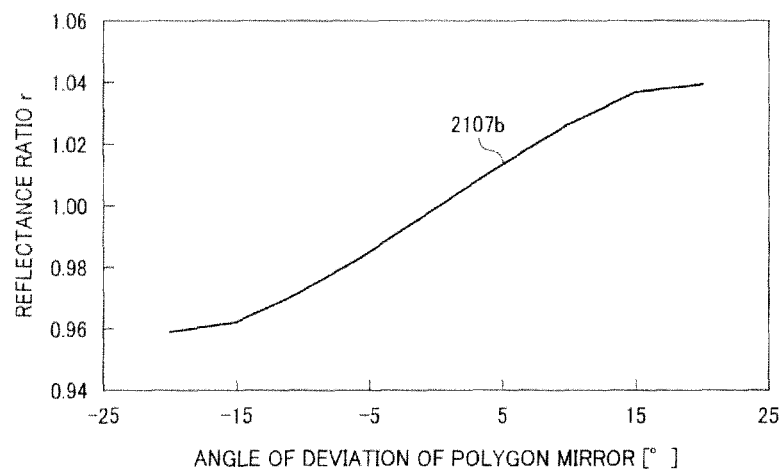
FIG. 57 is a graph that illustrates the relation between the reflectance ratio of the reflecting mirror 2107*b* and the angle of deviation of the polygon mirror.

FIG. 57 illustrates the relation between the reflectance ratio r of the reflecting mirror 2107*c* and the angle of deviation θp (°) of the polygon mirror.

Figure 58:
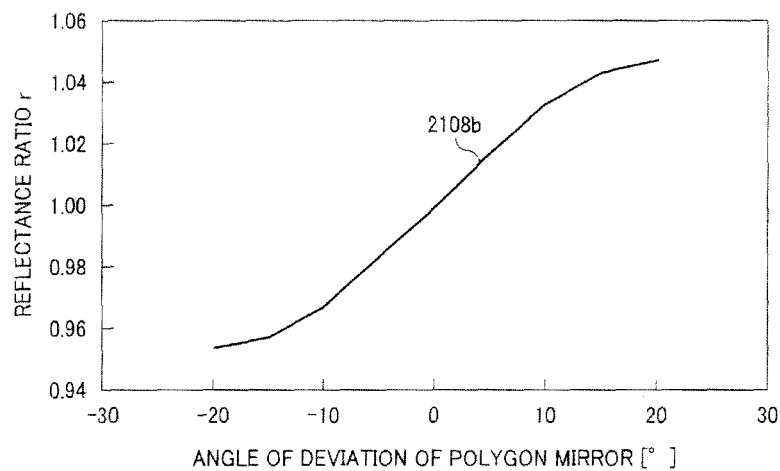
FIG. 58 is a graph that illustrates the relation between the reflectance ratio of the reflecting mirror 2108*b* and the angle of deviation of the polygon mirror.

FIG. 58 illustrates the relation between the reflectance ratio r of the reflecting mirror 2108*c* and the angle of deviation θp (°) of the polygon mirror.

Figure 59:
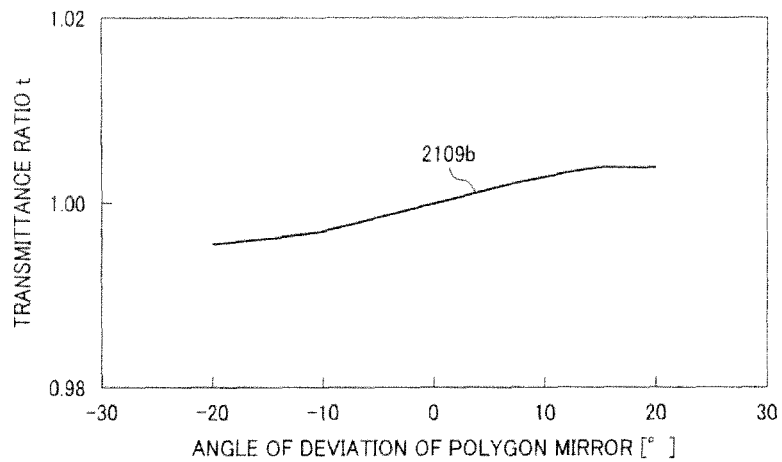
FIG. 59 is a graph that illustrates the relation between the transmittance ratio of the dustproof glass 2109*b* and the angle of deviation of the polygon mirror.
Figure 60:
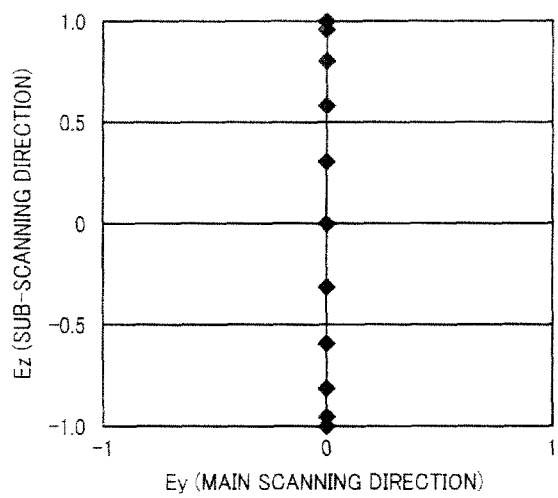
FIG. 60 is a first graph that illustrates the effects of birefringence of the scanning lens with respect to the polarized state of incident light.
Figure 61B:
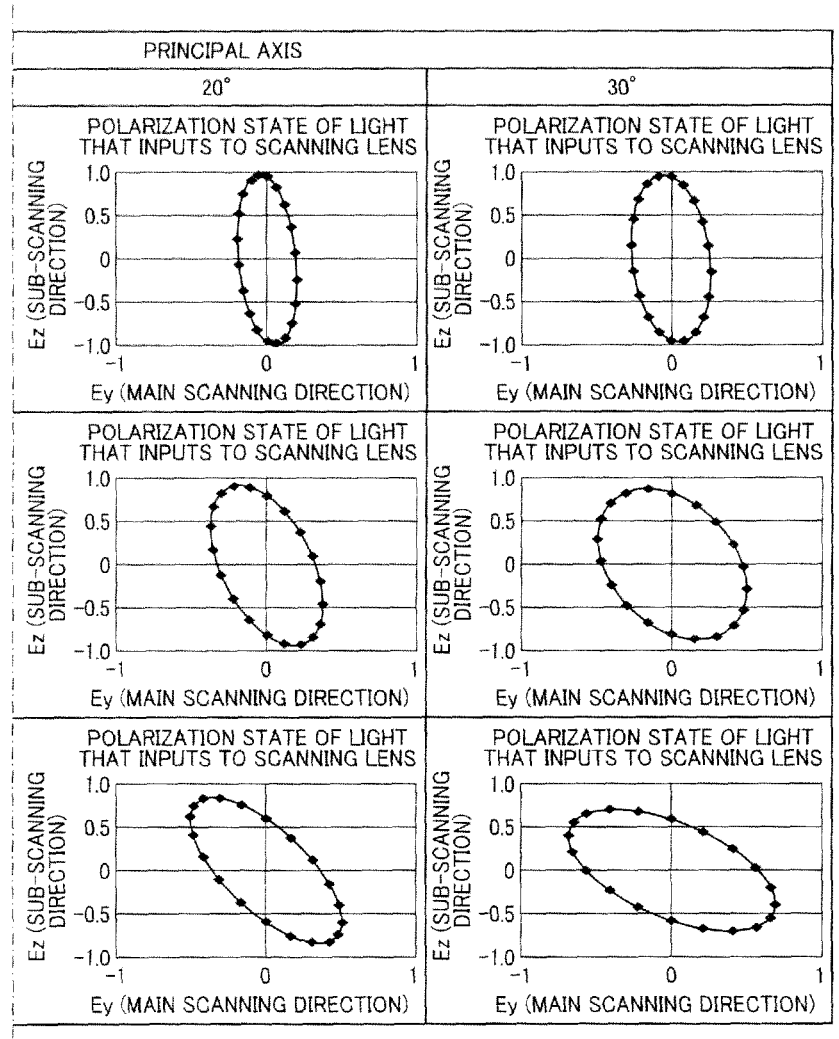
FIG. 61 is a second graph that illustrates the effects of birefringence of the scanning lens with respect to the polarized state of incident light.

FIG. 59 illustrates the relation between the transmittance ratio t of the dustproof glass 2109*c* and the angle of deviation θp (°) of the polygon mirror.

If the quarter-wave plate is inserted, light that is input to the scanning lens becomes always circularly polarized light; therefore, when the angle of deviation of the polygon mirror is 0°, the reflectance does not change depending on the direction of polarization of the luminous flux emitted from the light source. Therefore, in FIGS. 56 to 58, when the angle of deviation of the polygon mirror is 0°, the reflectance ratio is always 1.00. In FIG. 59, when the angle of deviation of the polygon mirror is 0°, the transmittance ration is also 1.00.

However, when the angle of deviation of the polygon mirror is other than 0°, when the luminous flux passes through the scanning lens, the birefringence occurs and the luminous flux is converted into elliptically polarized light. The polarized state changes depending on the angle of deviation of the polygon mirror; therefore, even if the quarter-wave plate is inserted, it is impossible to decrease the variation in the light use efficiency.

With reference to FIGS. 56 to 59, as for the magnitude relation between r(−20) and r(+20) and the magnitude relation between t(−20) and t(+20), the reflecting mirror 2106c satisfies r(−20)>r(+20), the reflecting mirror 2107c satisfies r(−20)<r(+20), the reflecting mirror 2108c satisfies r(−20)<r(+20), and the dustproof glass 2109c satisfies t(−20)<t(+20). In other words, when comparing the three reflecting mirrors (2106c, 2107c, and 2108c) and the dustproof glass 2109c, the reflecting mirror 2106c has the inverse magnitude relation to the magnitude relation of the other reflecting mirrors (2107c and 2108c) and the dustproof glass 2109c.

The difference between the maximum value and the minimum value of the reflectance ratio r is 0.114 at the reflecting mirror 2106c; 0.082 at the reflecting mirror 2107c; and 0.093 at the reflecting mirror 2108c. The difference between the maximum value and the minimum value of the transmittance ratio t is 0.008 at the dustproof glass 2109c. In other words, the reflecting mirror 2106c has the largest difference among the three reflecting mirrors (2106c, 2107c, and 2108c) and the dustproof glass 2109c. This is because the reflecting mirror 2106c is coated with a single layer, while the other reflecting mirrors (2107c and 2108c) and the dustproof glass 2109c are not.

As described above, according to the fourth embodiment, even when the luminous fluxes emitted from a plurality light-emitting elements has different directions of polarization, the optical scanner 2010 can decrease variation in the intensity of light on each photosensitive drum.

Because the MFP 2000 used in the fourth embodiment includes the optical scanner 2010, the MFP 2000 can be provided with a lower cost without decreasing the image quality.

Although, in the fourth embodiment, the surface-emitting laser array 100 has 40 light-emitting elements, the configuration is not limited thereto.

Although, in the above embodiments, an MFP is used as the image forming apparatus, some other devices may be used as the image forming apparatus, such as a copying machine, a printer, and a facsimile machine.

It is allowable to use, for example, an image forming apparatus that uses a photosensitive medium (e.g., a sheet of paper) and directly illuminates the photosensitive medium with a laser beam.

Moreover, it is allowable to use an image forming apparatus that uses a silver halide film as an image carrier. The image forming apparatus forms a latent image on the silver halide film by using optical scanning. The latent image is developed to a visible image by using the same process as a typical developing process for the silver halide photography. The visible image is transferred onto printing paper in the same manner as a typical printing process for the silver halide photography. This image forming apparatus can be used as a photo plate maker and an optical lithography system that forms a CT-scan image or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner that scans a subject to be scanned with a luminous flux in a main-scanning direction, the optical scanner comprising:

a light source that includes a plurality of light-emitting elements;

an optical deflector that deflects a luminous flux corning from the light source;

a scanning lens that collects the luminous flux that has been deflected by the optical deflector, the scanning lens is made of resin;

a plurality of reflecting mirrors, wherein each reflecting mirror bends a direction of an optical path of the luminous flux toward the subject to be scanned after the luminous flux passes through the scanning lens; and a dustproof glass that is disposed on the optical path of the luminous flux coming via the reflecting mirrors, wherein one optical element selected from optical elements that include the reflecting mirrors and the dustproof glass has magnitude relation inverse to that of the unselected optical elements and a range larger than those of the unselected optical elements, wherein (A) the magnitude relation of a particular optical element is a relation between a first characteristic value of the particular optical element when the luminous flux travels toward a scanning start position of the subject to be scanned and a second characteristic value of the particular optical element when the luminous flux travels toward a scanning end position of the subject to be scanned, and (B) the range of the particular optical element is a difference between a maximum characteristic value of the particular optical element and a minimum characteristic value of the particular optical element, and wherein in a case that the particular optical element is one of the reflecting mirrors, the characteristic value of the particular optical element is a ratio between (i) a first reflectance of a first luminous flux that has a direction of polarization parallel to a sub-scanning direction and (ii) a second reflectance of a second luminous flux that has a direction of polarization parallel to the main-scanning direction, both the first luminous flux and the second luminous flux being emitted from froth the light source, and in a case that the particular optical element is the dustproof glass, the characteristic value of the particular optical element is a ratio between a first transmittance of the first luminous flux and a second transmittance of the second luminous flux.

2. The optical scanner according to claim 1, wherein each of the optical elements has a coated surface, and the surface of the selected optical element is coated in a different manner from a manner in which the surfaces of the unselected optical elements are coated.

3. The optical scanner according to claim 2, wherein the number of coating layers of the selected optical element is smaller than the number of coating layers of the unselected optical elements.

4. The optical scanner according to claim 1, wherein the reflecting mirrors are arranged so that the optical path between the optical deflector and the subject to be scanned does not intersect, and the selected optical element is a reflecting mirror that is closest to the optical deflector among the optical elements.

5. The optical scanner according to claim 1, further comprising a quarter-wave plate between the light source and the optical deflector.

6. The optical scanner according to claim 1, wherein the light source is a surface-emitting laser array.

7. An image forming apparatus comprising:
at least one image carrier; and at least one optical scanner according to claim 1, wherein the optical scanner scans the image carrier with light that contains image data.

8. The image forming apparatus according to claim 7, wherein the image data is multi-color image data.

9. The image forming apparatus according to claim 1, wherein the selected optical element is coated with a layer of magnesium fluoride.

10. The image forming apparatus according to claim 1, wherein the unselected optical elements are coated with triple layers of magnesium fluoride, titanium dioxide and magnesium fluoride.

11. The image forming apparatus according to claim 1, wherein each of the optical elements is coated with triple layers of magnesium fluoride, titanium oxide and magnesium fluoride.

12. An optical scanner that scans a subject to be scanned with a luminous flux in a main-scanning direction, the optical scanner comprising:

a light source that includes a plurality of light-emitting elements;

an optical deflector that deflects a luminous flux coming from the light source;

a scanning lens that collects the luminous flux that has been deflected by the optical deflector, wherein the scanning lens is made of resin; and a plurality of reflecting mirrors, each reflecting mirror bends a direction of an optical path of the luminous flux toward the subject to be scanned after the luminous flux passes through the scanning lens, wherein one optical element selected from optical elements that include the reflecting mirrors has a magnitude relation inverse to that of the unselected optical elements and a range larger than those of the unselected optical elements, wherein the magnitude relation of a particular optical element is a relation between a first characteristic value of the particular optical element when the luminous flux travels toward a scanning start position of the subject to be scanned and a second characteristic value of the articular optical element when the luminous flux travels toward a scanning end position of the subject to be scanned, and wherein the range of the particular optical element is a difference between a maximum characteristic value of the particular optical element and a minimum characteristic value of the particular optical element, and the characteristic value of the particular optical element is a ratio between (i) a first reflectance of a first luminous flux that has a direction of polarization parallel to a sub-scanning direction and (ii) second reflectance of a second luminous lux that has a direction of polarization parallel to the main-scanning direction, both of the luminous flux and the second luminous flux being emitted from the light source.

13. The optical scanner according to claim 12, wherein each of the optical elements has a coated surface, and the surface of the selected optical element is coated in a different manner from a manner in which the surfaces of the unselected optical elements are coated.

14. The optical scanner according to claim 13, wherein the number of coating layers of the selected optical element is smaller than the number of coating layers of the unselected optical elements.

15. The optical scanner according to claim 12, wherein the reflecting mirrors are arranged so that the optical path between the optical deflector and the subject to be scanned does not intersect, and the selected optical element is a reflecting mirror that is closest to the optical deflector among the optical elements.

16. The optical scanner according to claim 12, further comprising a quarter-wave plate between the light source and the optical deflector.

17. The optical scanner according to claim 12, wherein the light source is a surface-emitting laser array.

18. An image forming apparatus comprising:

at least one image carrier, and at least one optical scanner according to claim 12, wherein the optical scanner scans the mage carrier with light that contains image data.

19. The image forming apparatus according to claim 18, wherein the image data is multi-color image data.

* * * * *